(12) United States Patent
Roberge et al.

(10) Patent No.: US 8,876,583 B2
(45) Date of Patent: Nov. 4, 2014

(54) REGULATOR OF RESIDUE FLOW FOR SPREADING DEVICES ON AGRICULTURAL COMBINES

(75) Inventors: Martin Jean Roberge, Saskatoon (CA); Jason M. Benes, Mount Joy, PA (US); Andrew V. Lauwers, Stevens, PA (US); Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 1134 days.

(21) Appl. No.: 12/629,669

(22) Filed: Dec. 2, 2009

(65) Prior Publication Data

US 2011/0130181 A1 Jun. 2, 2011

(51) Int. Cl.
 *A01F 12/30* (2006.01)
 *A01D 41/12* (2006.01)
(52) U.S. Cl.
 CPC ......... *A01D 41/1243* (2013.01); *Y10S 460/901* (2013.01)
 USPC .......................................... 460/111; 460/901
(58) Field of Classification Search
 USPC .................................. 460/111–113, 901, 119
 See application file for complete search history.

(56) References Cited

U.S. PATENT DOCUMENTS

| | | | | |
|---|---|---|---|---|
| 2,500,682 A | * | 3/1950 | Hoffstetter | 198/640 |
| 2,854,046 A | * | 9/1958 | Devorak | 56/192 |
| 2,865,416 A | | 12/1958 | Hetteen | |
| 2,911,780 A | * | 11/1959 | Brady | 56/1 |
| 3,221,484 A | * | 12/1965 | Van Der Lely | 56/370 |
| 3,722,191 A | * | 3/1973 | Braunberger | 56/189 |
| 3,803,821 A | * | 4/1974 | Peacock et al. | 56/192 |
| 3,841,070 A | * | 10/1974 | Scarnato et al. | 56/14.4 |
| 4,532,941 A | * | 8/1985 | Gauthier | 460/112 |
| 5,501,635 A | * | 3/1996 | Niermann | 460/112 |
| 5,797,793 A | | 8/1998 | Matousek et al. | |
| 5,947,391 A | | 9/1999 | Beck et al. | |
| 6,416,405 B1 | | 7/2002 | Niermann | |
| 6,547,169 B1 | | 4/2003 | Matousek et al. | |
| 6,582,298 B2 | | 6/2003 | Wolters | |
| 6,598,812 B1 | | 7/2003 | Matousek et al. | |
| 6,602,131 B2 | | 8/2003 | Wolters | |
| 6,616,528 B2 | | 9/2003 | Wolters et al. | |
| 6,688,971 B2 | * | 2/2004 | Buermann et al. | 460/112 |
| 6,719,627 B2 | | 4/2004 | Wolters et al. | |
| 6,736,721 B2 | * | 5/2004 | Niermann et al. | 460/112 |
| 6,769,980 B2 | | 8/2004 | Wolters et al. | |
| 6,854,251 B2 | * | 2/2005 | Snider | 56/192 |

(Continued)

FOREIGN PATENT DOCUMENTS

DE 003322969 A1 1/1985
EP 000158335 A2 10/1985

(Continued)

*Primary Examiner* — Thomas B Will
*Assistant Examiner* — Joan D Misa
(74) *Attorney, Agent, or Firm* — Patrick M. Sheldrake; Seved V. Sharifi T.

(57) ABSTRACT

An agricultural combine having an adjustable spreader assembly is provided that includes a spreader with one or a pair of regulators. The spreader includes a discharge opening about its lateral side. The regulator is pivotably connected to the lateral side of the spreader such that the regulator is in fluid communication with the discharge opening. The regulator can be configured to move from a retracted position to an extended position or to vary the direction of discharge of crop residue. The spreader can be a vertical spreader, a horizontal spreader, or a spread board.

28 Claims, 24 Drawing Sheets

(56) References Cited

U.S. PATENT DOCUMENTS

| | | | |
|---|---|---|---|
| 7,066,810 B2 | 6/2006 | Farley et al. | |
| 7,186,179 B1 | 3/2007 | Anderson et al. | |
| 7,223,168 B2 | 5/2007 | Anderson et al. | |
| 7,261,633 B2 | 8/2007 | Benes | |
| 7,281,973 B2 | 10/2007 | Anderson et al. | |
| 7,281,974 B2 | 10/2007 | Anderson et al. | |
| 7,390,253 B2 | 6/2008 | Farley et al. | |
| 7,455,584 B2 | 11/2008 | Farley et al. | |
| 7,473,169 B2 | 1/2009 | Isaac | |
| 7,485,035 B1 | 2/2009 | Yde | |
| 7,487,024 B2 | 2/2009 | Farley et al. | |
| 7,544,126 B2 * | 6/2009 | Lauer et al. | 460/111 |
| 7,553,227 B2 * | 6/2009 | Landuyt | 460/111 |
| 7,635,299 B2 * | 12/2009 | Murray et al. | 460/111 |
| 8,105,140 B2 * | 1/2012 | Teroerde et al. | 460/112 |
| 2002/0142814 A1 * | 10/2002 | Niermann | 460/79 |
| 2004/0013506 A1 | 1/2004 | Guhr et al. | |
| 2004/0020198 A1 | 2/2004 | Brome et al. | |
| 2005/0124399 A1 | 6/2005 | Holmen | |
| 2006/0006256 A1 * | 1/2006 | Smith et al. | 239/666 |
| 2008/0268927 A1 * | 10/2008 | Farley et al. | 460/111 |

FOREIGN PATENT DOCUMENTS

| | | | |
|---|---|---|---|
| EP | 0331784 | 9/1989 | |
| EP | 551949 A1 | 7/1993 | |
| EP | 0631717 | 1/1995 | |
| EP | 2036422 A2 | 3/2009 | |
| EP | 2036423 A2 | 3/2009 | |
| JP | 9009775 A | 1/1997 | |
| WO | WO 2008156419 A1 * | 12/2008 | A01D 41/12 |

* cited by examiner

REGULATOR OF RESIDUE FLOW FOR SPREADING DEVICES ON AGRICULTURAL COMBINES

BACKGROUND OF THE INVENTION

The present invention relates generally to agricultural combines, and more particularly, to an adjustable regulator for a spreader assembly of an agricultural combine to discharge and regulate a flow of crop residue in a plurality of directions for disposition rearwardly of the combine over a field.

Agricultural equipment known as combines or combine harvesters are continuously being designed to increase capacity. Such designs include widening the headers of the harvesters. The wider headers provide a larger tonnage flow rate of crop without having to travel at faster field speeds. Wider headers however, pose a challenge to today's existing residue systems due to the requirements to spread crop residue as wide as the cut. As such, various concepts are being developed to replace the ordinary hood mount chopper and spread board systems of combine harvesters. Some of these concepts include horizontal discs placed directly behind the hood mount chopper. The horizontal discs expel the crop with more force then the knives of the hood mount chopper.

Another means to meet this challenge is the use of vertical spreader systems used on such agricultural combine products manufactured by e.g., Case New Holland. The challenge of any residue system however, is not only being able to spread the crop reside to a width of 40', 50' or 60', but also to do this in the presence of a strong (e.g., +10 MPH) side wind or cross wind. Such cross winds typically stall any sideways projection of the crop reside material, resulting in uneven distribution of crop residue. This is problematic because an uneven distribution of crop residue over a swath can lead to temperature and moisture gradients detrimental to even growth of future crops on the field, uneven insulation of the field resulting in uneven field warming and thawing and crop emergence during the following planting season, and increased rodent and insect habitat. It can also make it difficult for crops to utilize nutrients, and can impact the effectiveness of agricultural chemicals. Large discontinuities of crop residue can also lead to plugging and other functional problems with tillage and/or planting equipment.

Agricultural equipment has evolved to improve efficiency yet maintain realistic costs. In order to remain competitive, designs must continue to evolve in order to meet the economic needs of the end user. Increased efficiency through improved fuel economy has always been a significant driver in the industry. The economics of materials other than grain (MOG) or residue management has also become a significant driver in the industry. As agricultural practices continue to evolve through practices of minimum tillage and biomass harvesting, combine harvesters are required to deliver a consistent and thorough means for processing and spreading the residue. This evolving industrial focus and requirement for even spread of the residue material demands improved systems without adding excessive cost or complexity.

Currently, agricultural combines typically include a crop residue spreader for disposing of straw and other residue separated from the harvested crop onto the field from which the crop was harvested. In addition, some combines have a chaff spreader for spreading chaff residue separated from the grain by the cleaning apparatus or system onto the field.

Although various residue spreaders are known which can propel residue a distance equal to about one half the width of a typical combine header, many suffer from shortcomings, including a tendency to create uneven crop residue distribution or coverage in the side to side direction over the cut width. More particularly, for a vertical spreader, that is, a spreader utilizing one or more rotary impellers or other elements rotatable about a generally horizontal axis, or an axis oriented or tilted at a small acute angle to horizontal, and configured for directing a flow or flows of crop residue sidewardly; it has been found that the resultant coverage has a tendency to be uneven in the sidewardly direction. For instance, crop residue coverage can typically be thicker toward the outer regions or sides of the swath, and thinner or less uniform closer to the center of the swath.

Thus, there is a need for an adjustable spreader assembly that is economically feasible and effective at addressing the problems of conventional spreader assemblies, as discussed above. In particular, there is a need for a spreader assembly having a regulator that can be adjusted to provide for a desired pattern of crop residue distribution. Such desired distribution patterns include more evenly distributed side to side distributions over a region of the agricultural field from which the crop was harvested.

BRIEF SUMMARY OF THE INVENTION

In a preferred embodiment, the present invention provides an adjustable spreader assembly for an agricultural combine comprising: a spreader operatively connected to a rear end of the agricultural combine, the spreader including: a housing having: an inlet for receiving a flow of residue, and an outlet configured about a lateral side of the housing for discharging the flow of residue, rotary blades operatively connected to the housing for rotating therein, wherein rotation of the rotary blades discharges the flow of residue received through the inlet out through the outlet; and a regulator pivotably connected to a lateral side of the spreader about a substantially vertical axis to pivot the regulator in a fore and an aft direction and wherein the regulator is in fluid communication with the housing outlet for guiding and shielding the flow of residue discharged from the housing.

In another preferred embodiment, the present invention provides an adjustable vertical spreader assembly for an agricultural combine comprising: a vertical spreader operatively connected to a rear end of the agricultural combine, the vertical spreader including: an inlet for receiving a flow of residue, and an outlet configured along a lateral side of the vertical spreader for discharging the flow of residue; and a regulator in fluid communication with the outlet, the regulator including: a fore portion, an aft portion, and an upper portion connecting the fore and aft portions, and wherein the regulator is configured to move between a first position and a second position.

In yet another preferred embodiment, the present invention provides an adjustable horizontal spreader for an agricultural combine comprising: a horizontal spreader operatively connected to a rear end of the agricultural combine, the horizontal spreader including: an inlet for receiving a flow of residue, and an outlet configured along a lateral side of the horizontal spreader for discharging the flow of residue; and a regulator in fluid communication with the outlet, the regulator including: a fore portion, an aft portion, and an upper portion connecting the fore and aft portions, and wherein the regulator is configured to move between a first position and a second position.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
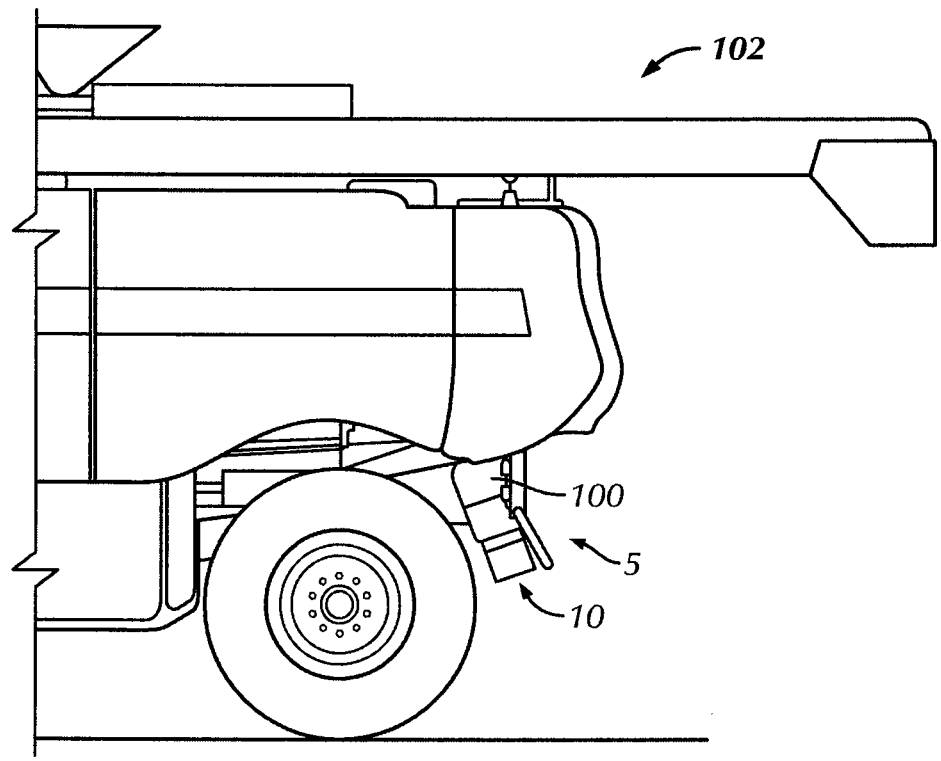
FIG. 1 is a partial, side, elevational view of a rear end of an agricultural combine with an adjustable spreader assembly in accordance with a preferred embodiment of the present invention having a vertical spreader and a regulator.

Certain terminology is used in the following description for convenience only and is not limiting. The words "right," "left," "upper," and "lower" designate directions in the drawings to which reference is made. In particular, "fore" means towards the front and "aft" means towards the rear. In addition, "superior" means generally above while "inferior" means generally below and "laterally" means towards the outer sides. The terminology includes the words above specifically mentioned, derivatives thereof, and words of similar import.

Referring to FIG. 1, in a first preferred embodiment, the present invention provides for a spreader assembly 5 that includes a vertical spreader 100 and an adjustable regulator 10. The regulator 10 is attachable to a vertical crop reside spreader or vertical spreader 100 of a combine 102. The vertical spreader 100 is operable for spreading straw, stalks, and other crop residue and trash that has been separated from the grain of crops by a threshing mechanism (not shown) of the combine 102. The straw, stalks and the like are propelled rearwardly by rotating beaters or the like (not shown) from the threshing mechanism and downwardly through a rear cavity of the combine 102 to the vertical spreader 100 for spreading. The structure, function and operation of such combines and threshing mechanisms are well known in the art and a detailed description of them is not necessary for a complete understanding of the present invention.

The vertical spreader 100 is configured on the combine 102 at the rear or aft position, as shown in FIG. 1. The vertical spreader 100 is also attached to the combine 102 in a substantially vertical configuration. The vertical spreader 100 can also be pitched slightly forwardly, as shown in FIG. 1 while still residing in a substantially vertical configuration.

Figure 2:
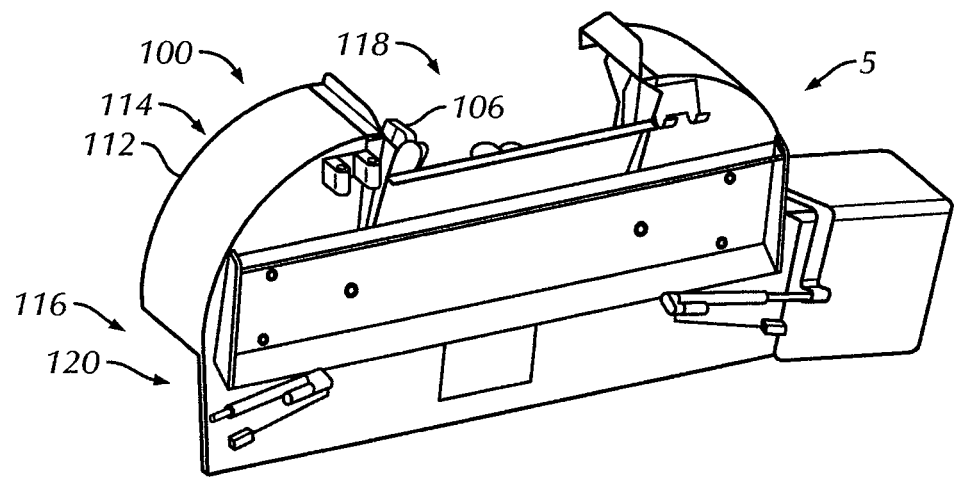
FIG. 2 is a rear, perspective view of the vertical spreader and regulator of FIG. 1 with the left regulator removed.
Figure 3:
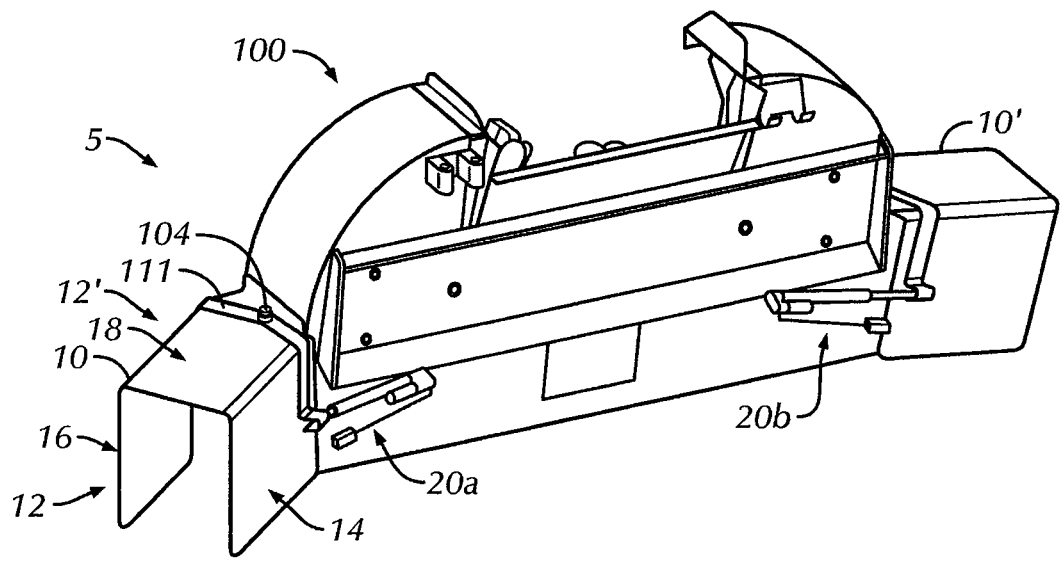
FIG. 3 is a rear, perspective view of the vertical spreader and regulator of FIG. 2 with the left regulator assembled to the vertical spreader.
Figure 4:
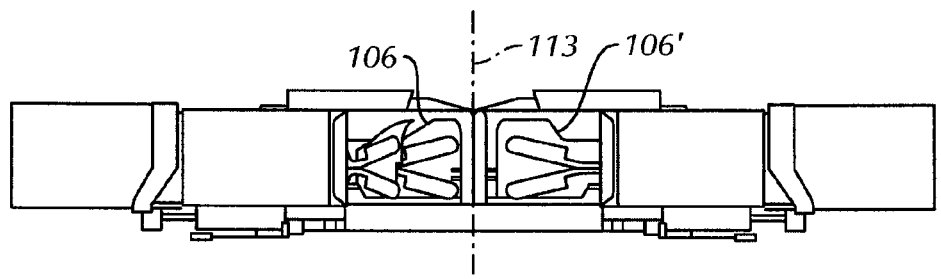
FIG. 4 is a plan view of the vertical spreader and regulators of FIG. 3.

As shown in FIGS. 2-4, the vertical spreader 100 preferably includes two vertical impellers 106, 106' in a side-by-side configuration. For sake of convenience only, the present embodiment will herein be described with reference to only a right side of the vertical spreader 100, as the left side, including impeller 106', is a mirror image of the right side of the vertical spreader 100.

The vertical spreader 100 includes a housing 112 and rotary blades 106 constructed and operable in a well known manner. The housing 112 includes a generally arch shaped upper portion 114 and a substantially vertical side or lateral portion 116. The housing 112 also includes an inlet upper open portion 118 in fluid communication with the threshing mechanism for receiving a flow of crop residue. The lateral portion 116 includes an outlet or a discharge opening 120. The discharge opening 120 is configured to allow the flow of crop residue being discharged by the vertical spreader 100 to flow only in the lateral direction of the vertical spreader 100.

Referring now to FIG. 3, the regulator 10 is pivotably connected to a lateral side of the vertical spreader 100. The regulator 10 can be configured with one or more guide surfaces, such as a guiding surface or aft portion 14. The regulator 10 is positioned for use in cooperation with respective impeller or rotary blades 106 (FIG. 4) of the vertical spreader 100 for receiving and carrying a flow of crop residue discharged through the discharge opening 120. The crop reside can be discharged in a generally rearwardly and/or sidewardly direction, away from the vertical spreader 100, for distribution in a desired pattern on a just harvested swath of a field over which the combine 102 is moving. That is, the regulator 10 is adjustable so as to be configurable to discharge a flow of crop reside in a range of directions substantially perpendicular to a direction of travel of the agricultural combine 102 and/or rearwardly of the combine 102. It should be understood that the term "sidewardly" refers to a direction transverse or perpendicular to the fore and aft directions, the term "outwardly sidewardly" refers to a sidewardly direction away from a center line 113 (FIG. 4) of the vertical spreader 100, the term "sidewardly inwardly" means closer to center line 113. In general, the regulator 10 can be adjusted to discharge crop residue in a plurality of angles relative to the direction of travel of the combine 102, such as from 10° to 90° relative to the direction of travel of the combine 102.

As shown in FIG. 3, the regulator 10 is mounted to the outwardly lateral side of the vertical spreader 100. The regulator 10 is generally sized to complement, circumvent or otherwise surround or partially surround the discharge opening 120 of the vertical spreader 100, such that the regulator 10 can readily receive an uninterrupted flow of crop residue from the vertical spreader 100. That is, the regulator 10 forms a flow path for the flow of crop residue through the regulator 10 that is in fluid communication with the discharge opening 120.

The regulator 10 is pivotably connected to the lateral side of the vertical spreader 100 by a pivot mechanism 104. Such pivot mechanisms 104 are well known in the art and a detailed description of their structure, function and operation is not necessary for a complete understanding of the present invention. However, exemplary pivot mechanisms can include e.g., a nut and bolt fastener 104, as shown in FIG. 3. For example, the regulator 10 can be mounted to the vertical spreader 100 by a support structure 111. The support structure 111 can be a pair of L-shaped brackets that are attached to the regulator 10, and further pivotally connected to the vertical spreader 100 by the pivot mechanism 104. Preferably, the regulator 10 is pivotably connected to the vertical spreader 100 so as to pivot in the fore and aft directions.

Figure 5A:
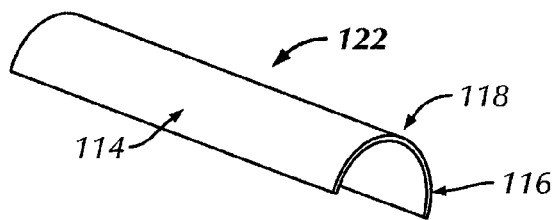
FIG. 5A is a perspective view of a regulator in accordance with another aspect of the present invention.
Figure 5B:
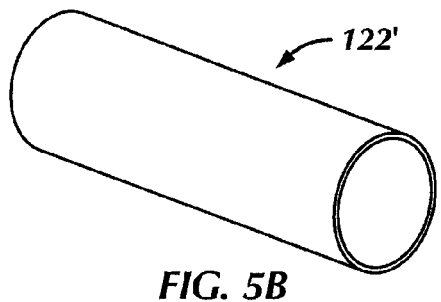
FIG. 5B is a perspective view of a regulator in accordance with yet another aspect of the present invention.
Figure 6:
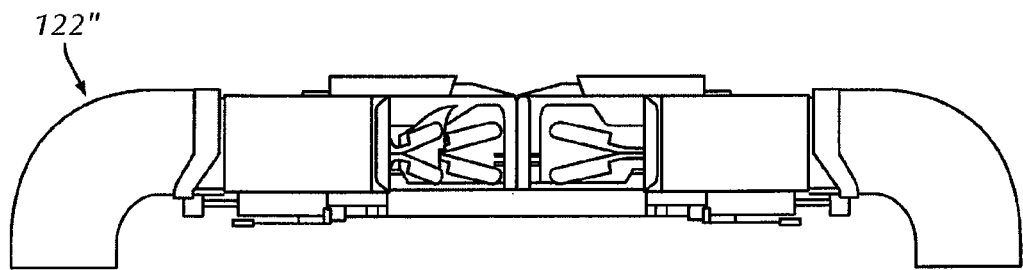
FIG. 6 is a plan view of a vertical spreader and a regulator in accordance with a further aspect of the present invention.

The regulator 10 is preferably configured with an aft portion 14, a fore portion 16 and a upper portion 18 connecting the aft and fore portions 14, 16. The aft 14, fore 16 and upper portions 18 can be individual units or a single combined unit, such as a generally arched shaped unit. Preferably, the regulator 10 is configured with a planar aft 14, planer fore 16 and planer upper portion 18, as shown in FIG. 3. However, the regulator 10 can alternatively be configured as a inverted "U" or arched configuration 122 (FIG. 5A) having an aft portion 114, a fore portion 116 and an upper portion 118. The arched configuration 122 can arc up to 360 degrees 122' (FIG. 5B). The regulator 10 can alternatively be configured as a curved regulator 122", as shown in FIG. 6, having a curvature of up to 270 degrees. The regulator 10 can be constructed out of any rigid construction material, such as a metal, a plastic, a composite or any other material suitable for its intended use.

The fore portion 16 is configured to deflect a flow of crop reside sidewardly and/or rearwardly (i.e., towards the lateral and aft direction of the combine 102). The fore portion 16 can be of an arched configuration (FIG. 6) or of a planar configuration (FIG. 3).

The regulator 10 also includes remotely controllable adjustors 20a, 20b for independently adjusting each of the regulators 10, 10' in either the fore or aft direction. The remotely controllable adjustors 20a, 20b can be, for example, remotely controllable actuators 20a, 20b. Referring to FIG. 3, the remotely controllable actuators 20a, 20b are connected to a rearward facing end of the combine 102. The remotely controllable actuators 20a, 20b are connected to the vertical spreader 100 for effecting fore and aft rotation of the regulators 10, 10' about a substantially vertical axis. That is, one end of the actuator 20a is pivotably connected to a rear portion of the vertical spreader 100 while the other end of the actuator 20a is pivotably connected to a rear portion 14 of the regulator 10. Further, the remotely controllable actuators 20a, 20b can be any suitable commercially available device, such as, but not limited to, electric or other motors, cylinders, solenoids, linear actuators, or the like, and can be controlled from any suitable location of the combine 102, such as an operator cab (not shown).

The regulator's length extending laterally and rearwardly can vary depending on the required use. However, the length of the regulator 10 is preferably about 2 feet, 5 feet, 10 feet, 15 feet and/or 20 feet in length. Moreover, each of the aft, fore and upper portions 14, 16, 18 can each independently vary in length, however, each of the aft, fore and upper portions 14, 16, 18 are preferably configured to be about the same length. Furthermore, the regulator 10 can be configured such that a distal end 12 of the regulator 10 has a smaller cross-sectional area than a proximal end 12' of the regulator 10.

Figure 7:
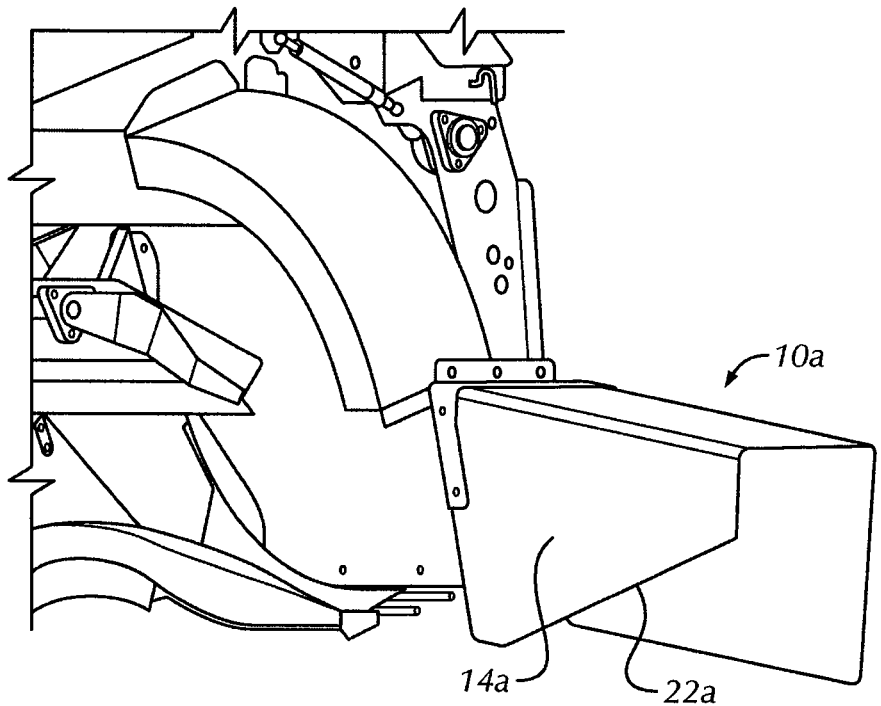
FIG. 7 is a partial, rear, perspective view of the vertical spreader of FIG. 1 with a regulator in accordance with another aspect of the present invention.

Referring now to FIG. 7, in another embodiment, the regulator 10a includes an aft portion 14a with a tapered portion 22a. The tapered portion 22a tapers in an outwardly and upwardly direction i.e., the lateral superior direction. The tapered portion 22a advantageously distributes the flow and spread of crop residue more gradually across a swath of a field, compared to a non-tapered regulator.

Figure 7A:
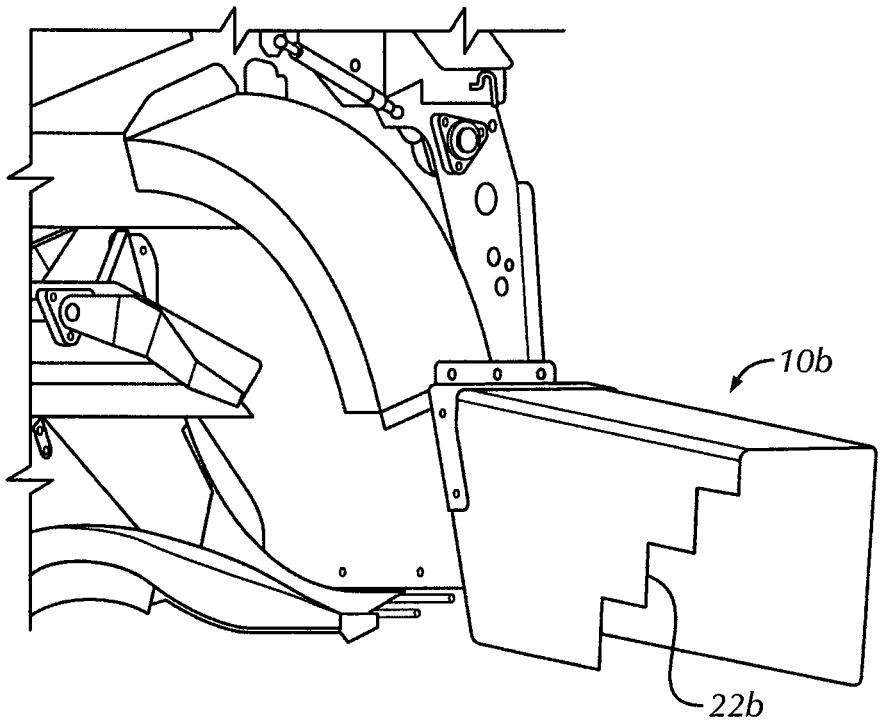
FIG. 7A is a partial, rear, perspective view of the vertical spreader of FIG. 1 with a regulator in accordance with yet another aspect of the present invention.

Alternatively, the tapered portion 22a can be configured with a stepwise taper 22b, as shown on regulator 10b in FIG. 7A. The stepwise taper 22b advantageously provides an improved distribution of crop residue by releasing the crop reside gradually across a swath.

An important advantage of the regulator 10 is the ability to adjustably position each of the regulators 10, 10' (FIG. 3) through a range of fore and aft positions. The ability to vary the fore and aft position of the regulators 10, 10' allows the combine 102 to more advantageously distribute and adjust the distribution pattern of crop residue over a field. Moreover, the adjustability of the regulators 10, 10' in combination with the tapered portions e.g., 22a, 22b provides for greater spread and uniformity of the crop residue. This is important for a variety of purposes, among which is the uniform emergence of subsequently planted crops, and the uniform application of chemicals and fertilizers onto the field, which can be negatively affected by the non-uniform distribution of crop residue.

In yet another embodiment, the regulator 10c can be configured with vanes 12c configured about an inner surface of the regulator 10c. The vanes 12c can be connected to any portion of the inner surface of the regulator 10c. Preferably, the vanes 12c are connected to an inner surface of the upper portion 18c of the regulator 10c so as to extend downwardly towards the ground. In general, the vanes 12c are configured to direct the flow of air and crop residue being discharged at an angle relative to the longitudinal direction of the regulator 10c. For example, the vanes 12c can be configured to deflect a portion of the flow of crop residue downwardly to more gradually distribute the flow of crop residue across the swath of a field.

Figure 8:
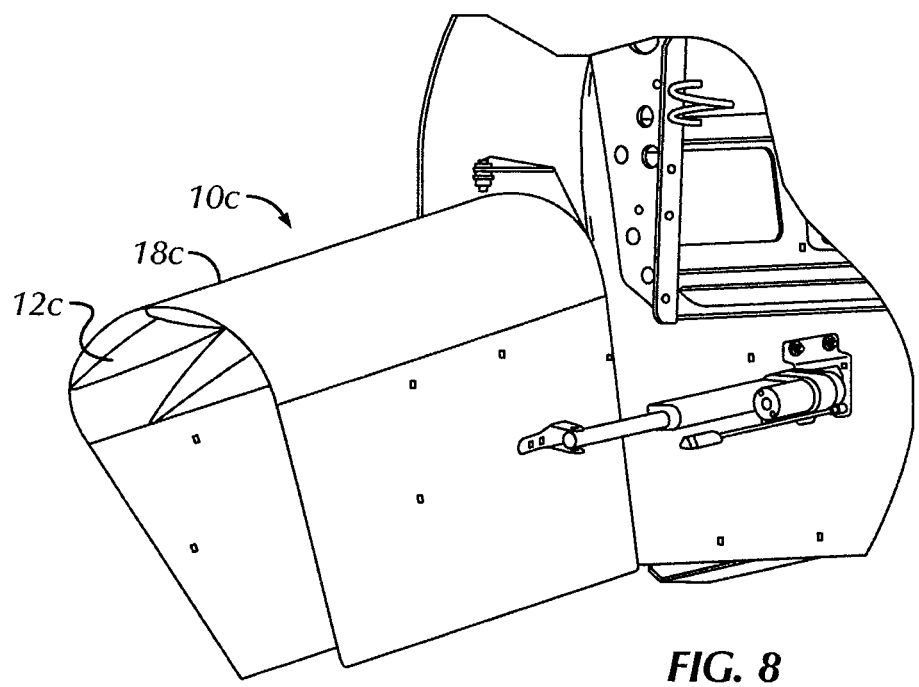
FIG. 8 is a partial, rear, perspective view of the vertical spreader of FIG. 1, with a regulator in accordance with another aspect of the present invention.
Figure 8A:
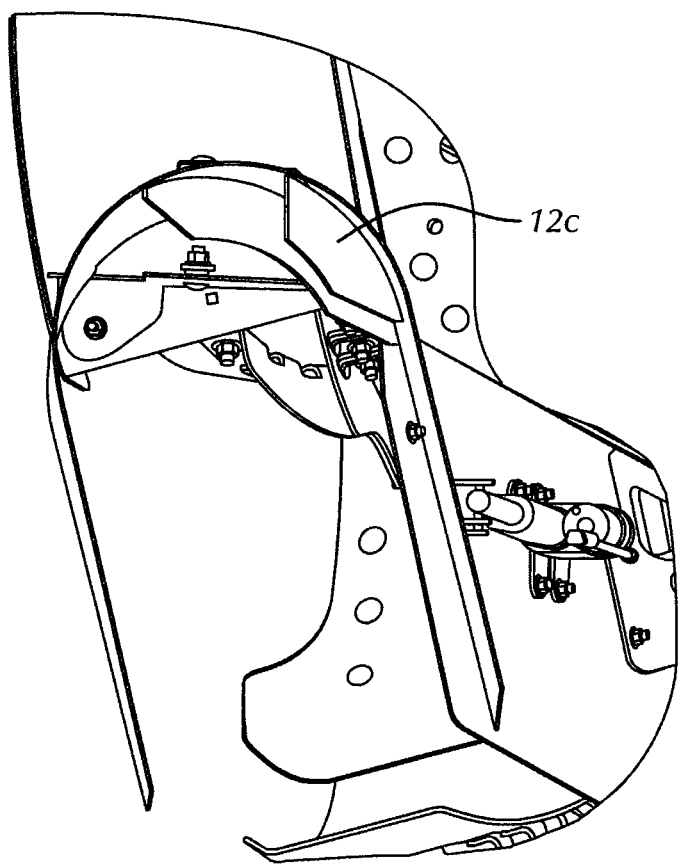
FIG. 8A is a partial, side, elevational view of the regulator of FIG. 8.
Figure 8B:
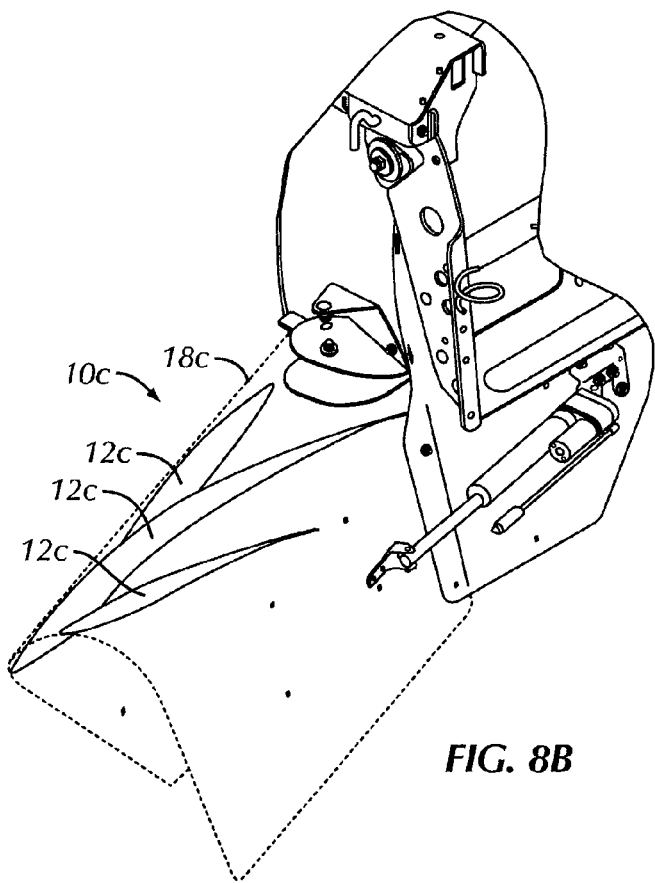
FIG. 8B is a partial, rear, perspective view of the regulator of FIG. 8 with the walls of the regulator in phantom.
Figure 8C:
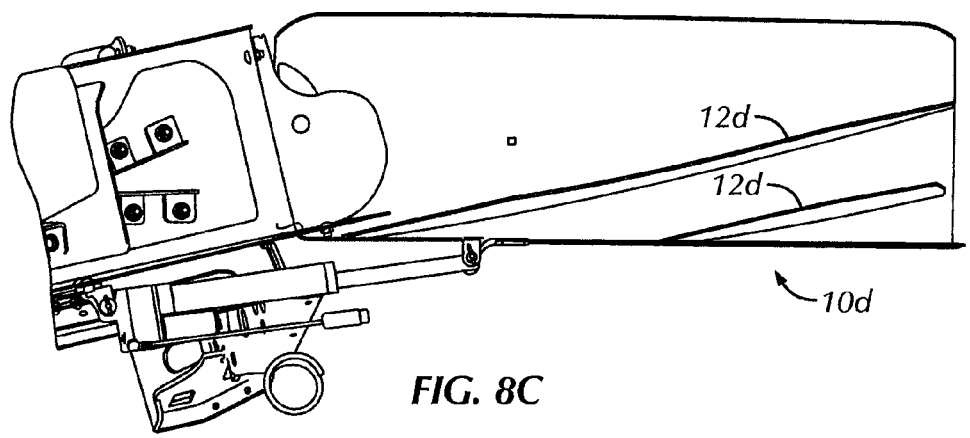
FIG. 8C is a partial, inferior view of the vertical spreader of FIG. 1, with a regulator in accordance with a further aspect of the present invention.

The vanes 12c are preferably configured as generally arced planar vanes, as shown in FIGS. 8-8B. Alternatively, the vanes 12d can be configured as simple planar segments, as shown in FIG. 8C. The vanes 12c, while preferably shallow vanes extending only a portion of the height of the regulator 10c, can alternatively be configured with any length ranging from 5% to 100% of the height of the regulator 10c. The height of the regulator 10c being the length of the regulator 10c as measure from its bottom to its top. Referring to FIG. 8B, the vanes 12c are preferably arranged with three vanes 12c connected to an inner surface of the upper portion 18c of the regulator 10c having a right-handed orientation or curvature, similar to right-handed threads of a typical screw. The right-handed curvature of the vanes 12c additionally directs the flow of air and crop residue being discharged from the regulator 10c towards the right and downwardly as it exits the regulator 10c. Conversely, the regulator 10c can be configured with vanes having a left-handed orientation or curvature (not shown) for directing the discharge of crop reside towards the left and downwardly as it exists the regulator 10c.

As shown in FIG. 8C, substantially planar vanes 12d can also be connected to the regulator 10d at an angle (angled to the left shown in FIG. 8C) to provide for directional control over the flow of crop residue being discharged from the regulator 10d. The regulator 10d provides for control over the flow of crop residue being discharged and advantageously direct the flow towards the left and downwardly as it exists the regulator 10d.

Figure 9:
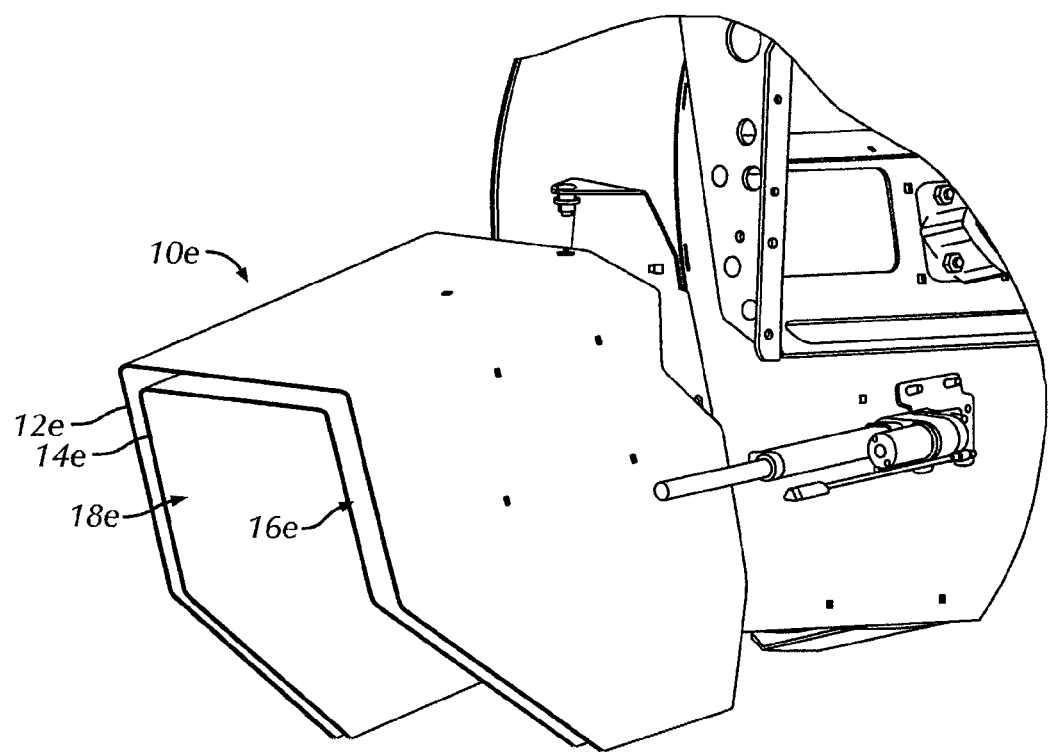
FIG. 9 is a partial, rear, perspective view of the vertical spreader of FIG. 1, with a regulator in accordance with another aspect of the present invention.

FIG. 9 illustrates another preferred embodiment of a regulator 10e. In this embodiment, the regulator 10e includes an outer shell 12e and an inner shell 14e, each of which preferably includes an aft portion, a fore portion and an upper portion. The outer shell 12e and inner shell 14e are configured with a profile that generally matches each other, except for the inner shell 14e being a slightly smaller version than the outer shell 12e. The inner shell 14e is also uniformly spaced apart from the outer shell 12e thereby defining a flow path 16e. Preferably, the spacing is about 0.5 to 12 inches and more preferably from about 1 to 3 inches.

The flow path 16e is in communication with a high pressure, high speed air supply (not shown) such as a squirrel cage fan, that supplies high velocity of air to the flow path 16e. The flow of air discharged from the flow path 16e results in a wall or curtain of air that is outputted and substantially surrounds the crop residue being discharged from the discharge opening 18e of the regulator 10e. The flow path 16e is also not in communication with the discharge opening 18e. As a result, the curtain of air discharged by the flow path 16e advantageously provides a barrier to the flow of crop residue being discharged from the discharge opening 18e while simultaneously facilitating the discharge/flow of crop residue from the regulator 10e. The curtain of air provides a barrier by shielding the flow of crop residue from the effects of environmental crosswinds.

In other words, the regulator 10e includes a first channel 16e for discharging a first output of high velocity air that partially surrounds a second channel 18e that discharges a second output of crop residue. Preferably, the first channel 16e is configured to surround the second channel 18e about its aft, fore and upper areas.

Figure 10:
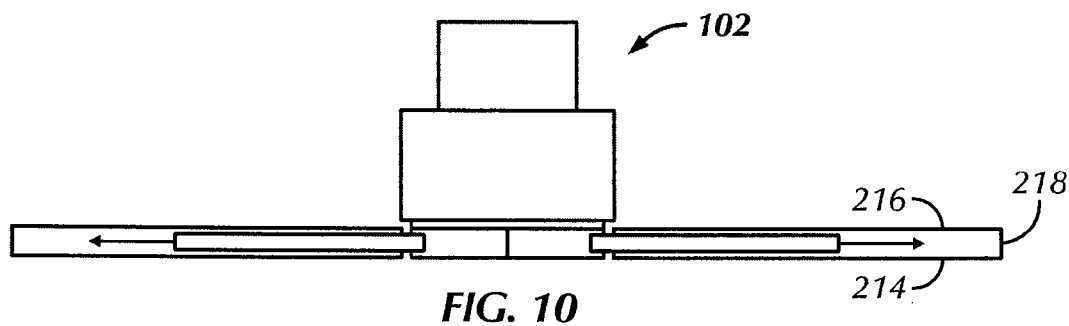
FIG. 10 is a plan view of an agricultural combine with a pair of vertically pivoting regulators in accordance with a further aspect of the present invention.
Figure 10A:
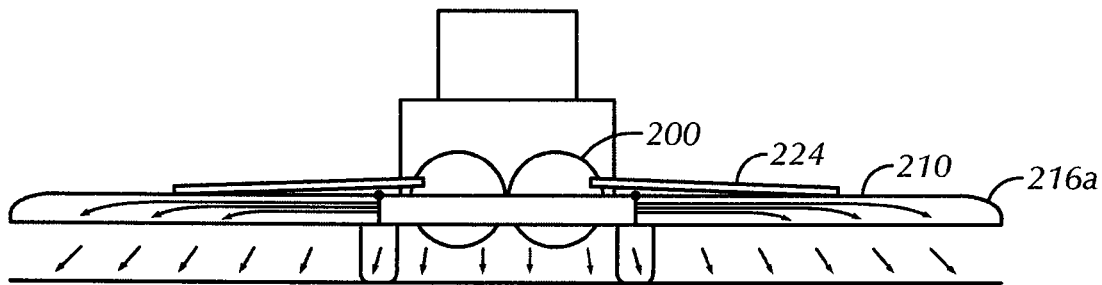
FIG. 10A is a rear, elevational view of the agricultural combine of FIG. 10.
Figure 10B:
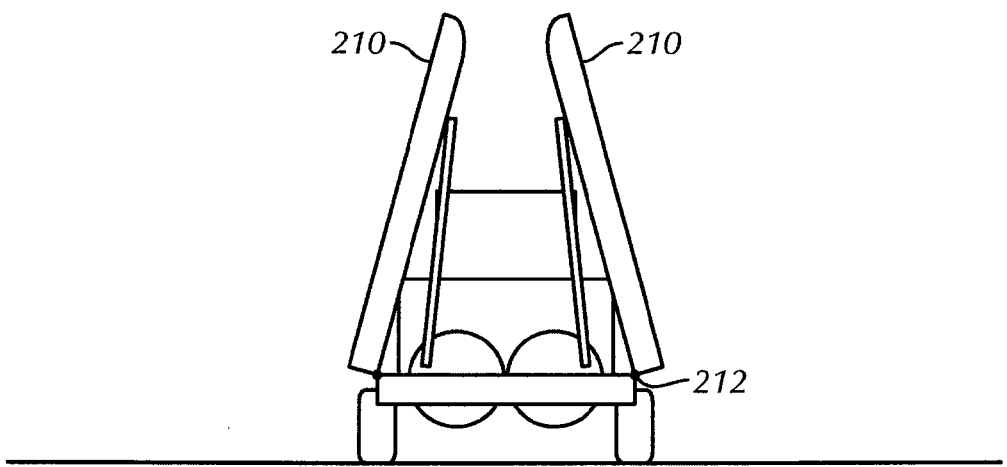
FIG. 10B is a rear, elevational view of the agricultural combine of FIG. 10 with the regulators in a retracted position.

In another embodiment, as shown in FIGS. 10-10B, the present invention provides for an agricultural combine 201 that includes at least one vertical spreader 200 and at least one regulator 210 pivotably connected to a lateral side of the vertical spreader 200 about a horizontal axis 212. The regulator 210 is an elongated regulator 210 and can be configured as in any of the above described embodiments i.e., similar to regulators 10-10e.

Figure 11:
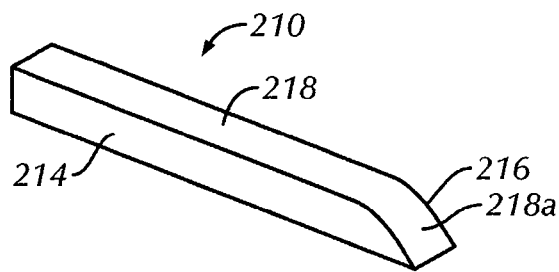
FIG. 11 is a perspective view of the regulator of FIG. 10.

Referring to FIG. 11, the regulator 210 can be configured as with a fore portion 216, an aft portion 214, and an upper portion 218 connecting the fore 216 and aft 214 portions, but with an elongated configuration so as to extend to an overall length from about two (2) feet to about fifteen (15) feet, twenty (20) feet, or thirty (30) feet. Alternatively, the regulator 210 can be configured with at least two guide surfaces for guiding or deflecting the flow of crop reside, but is preferably configured with three guide surfaces, such as the fore portion 216, aft portion 214 and upper portion 218. The regulator 210 can also be configured with a downwardly arched upper end portion 218a so as to direct the flow of crop residue downwardly.

Figure 12:
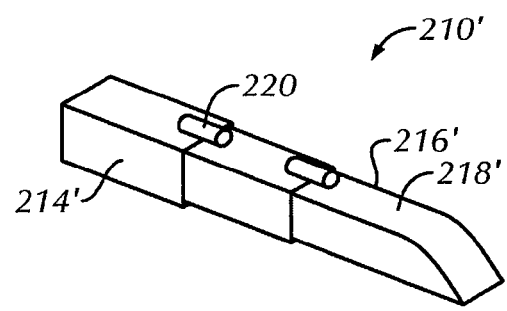
FIG. 12 is a perspective view of a regulator in accordance with another aspect of the present invention.

In an alternative configuration, as shown in FIG. 12, the regulator 210' can be configured as a telescoping regulator 210' that extends to varying lengths to provide additional versatility and maneuverability to the combine 102. The regulator 210' can be extended by any conventional means such as, but not limited to, actuators 220, which can be position about the upper portion 218' or a fore or aft portion 216', 214'. The regulator 210' can be extended e.g., to an overall length of at least two (2) feet or at least thirty (30) feet. Thus, the regulator 210' is extendable from a retracted position to an extended position.

Figure 13:
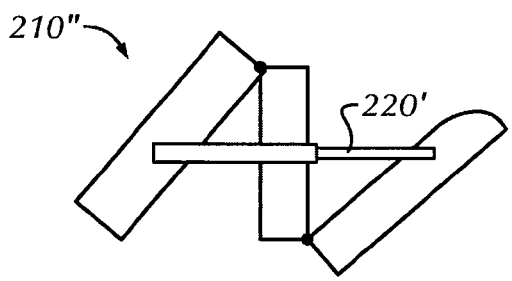
FIG. 13 is a side, elevational view of a regulator in accordance with yet another aspect of the present invention in a retracted position.
Figure 14:
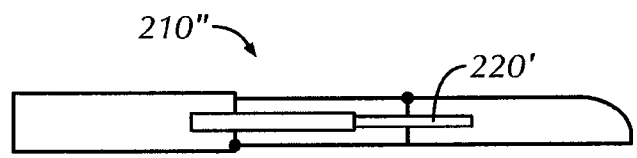
FIG. 14 is a side, elevational view of the regulator of FIG. 13 in an extended position.

In yet another configuration, as shown in FIGS. 13 and 14, the regulator 210" can be configured as a foldable regulator 210". The foldable regulator 210" can be configured e.g., with three individual regulator portions that folds on top of each other so as to collapse into a retracted position (FIG. 13.) The foldable regulator 210" can also be configured with an actuator 220' or other extension means for extending the foldable regulator 210" to an extended position (FIG. 14).

Figure 15:
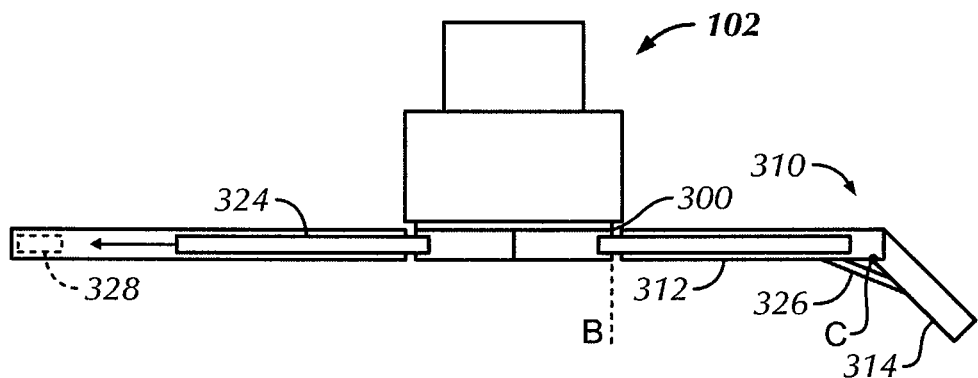
FIG. 15 is a plan view of an agricultural combine with a regulator that includes a vertically pivoting portion and a horizontally pivoting portion in accordance with another aspect of the present invention.

As shown in the top plan view of FIG. 15, the regulator 310 can alternatively be configured to include a first portion 312 pivotably connected to the vertical spreader 300 about a horizontal axis "B" and a second portion 314 pivotably connected to the first portion 312 about a vertical axis "C" which extends into the page. The pivotably connected first and second portions 312, 314 can be configured with actuators 324 and 326, respectively for providing pivoting movement. The regulator 310 can optionally include a retarder 328 to reduce the crop residue velocity flowing through the regulator 310.

Referring back to FIGS. 10-10B, the regulator 210 is pivotably connected to the vertical spreader 200 about horizontal axis 212. The pivotable connection can be by a hinge mechanism or a pivot mechanism, which are known in the art. A lift cylinder 224 connects to the regulator 210 on one end and the combine 102 on the other end. The cylinder 224 operates to lift the regulator 210 from a substantially horizontal direction to a substantially vertical direction, such as shown in FIGS. 10A and 10B, respectively. Preferably, the regulators 210, while in the substantially vertical position, are slightly angled inwardly (FIG. 10B).

Figure 16:
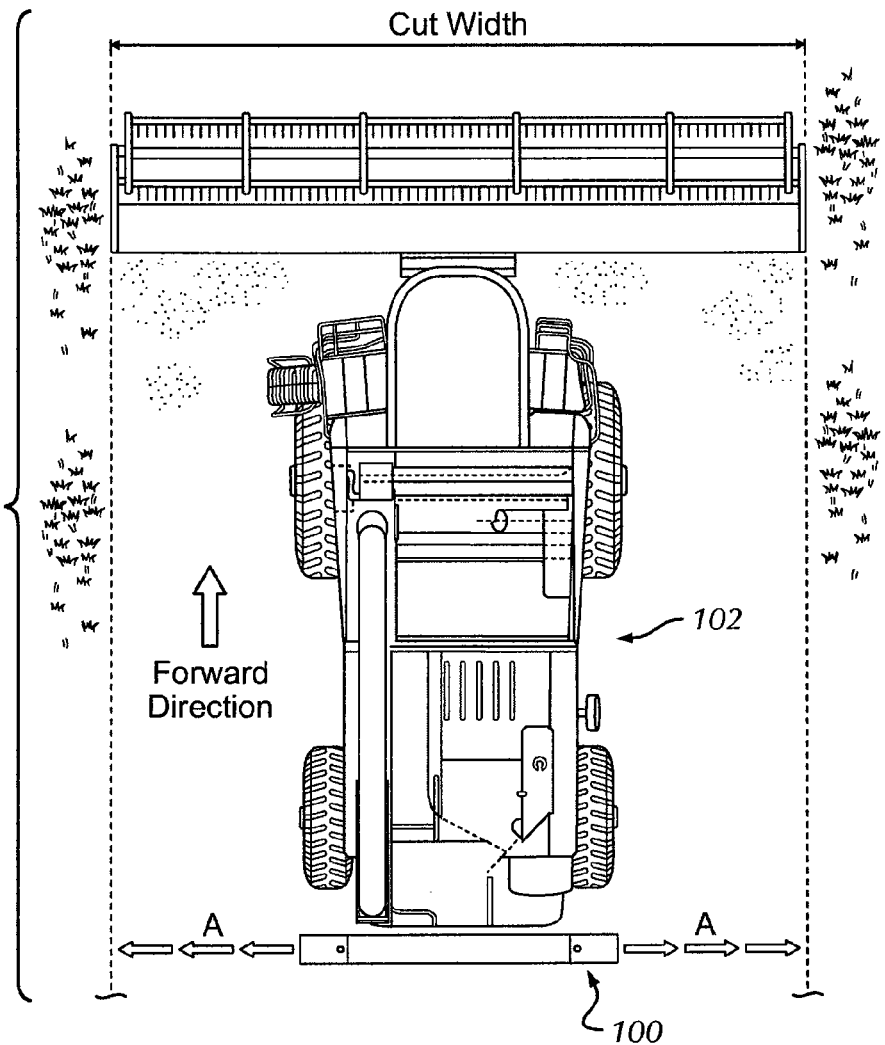
FIG. 16 is a plan view of an agricultural combine having the adjustable spreader assembly of FIG. 1 illustrating the operation of the combine for distributing crop residue perpendicular to the direction of travel of the combine.
Figure 16A:
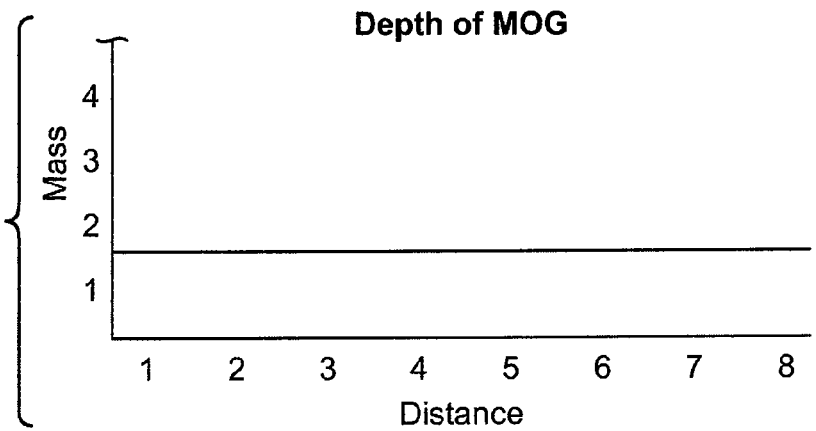
FIG. 16A is a chart of the expected depth of MOG when the combine of FIG. 16 is operated under no external crosswind conditions.

FIGS. 16-18C illustrate the utility of the regulator 10 of the present invention. FIG. 16 illustrates the goal of any residue discharge system. That is, the goal of a discharge system is to always match the cut width (CW) produced by the header of the combine 102. The spreader 100 is directed to flow MOG directly perpendicular to the direction of travel (the forward direction) thereby distributing crop residue or MOG across the cut width. Such a distribution can be accomplished with the perpendicular orientation of the flow of MOG under no external environmental conditions, such as crosswinds. The matched distribution of MOG by the spreader 100 is illustrated by arrows A. FIG. 16A illustrates what an ideal uniform matched distribution of MOG would look like charted over cut width along the x-axis (distance) and mass units along the y-axis.

Figure 17:
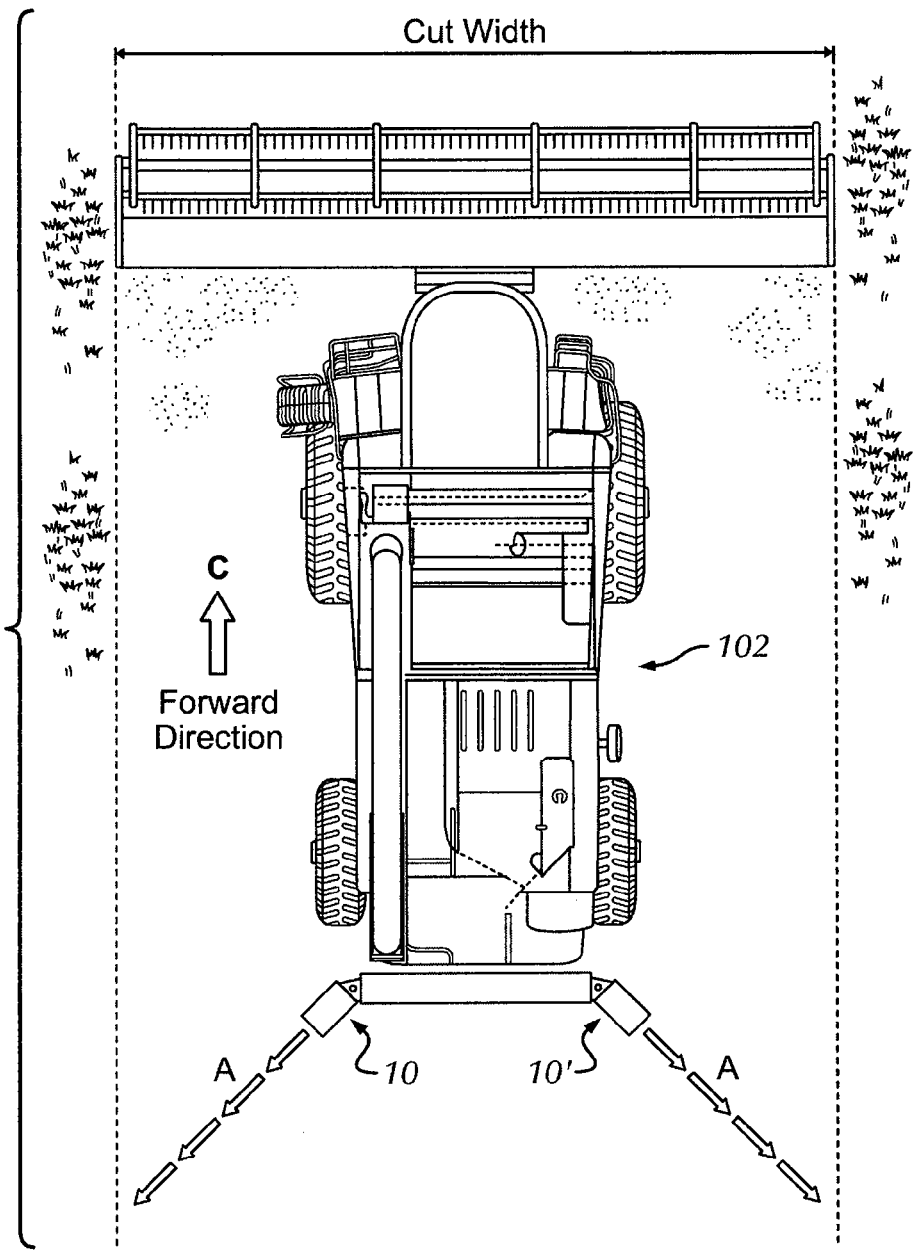
FIG. 17 is a plan view of an agricultural combine discharging crop residue rearwardly at an angle relative to the direction of travel of the combine.

To further illustrate the utility and advantages of the present invention, FIG. 17 illustrates the regulators 10, 10' operated at an angle of about 135 degrees relative to the forward direction of travel, represented by arrow C. In this position, and under conditions of no external crosswinds, the spread of MOG represented by arrows A, is configured to be distributed over the cut width of the header.

Figure 18:
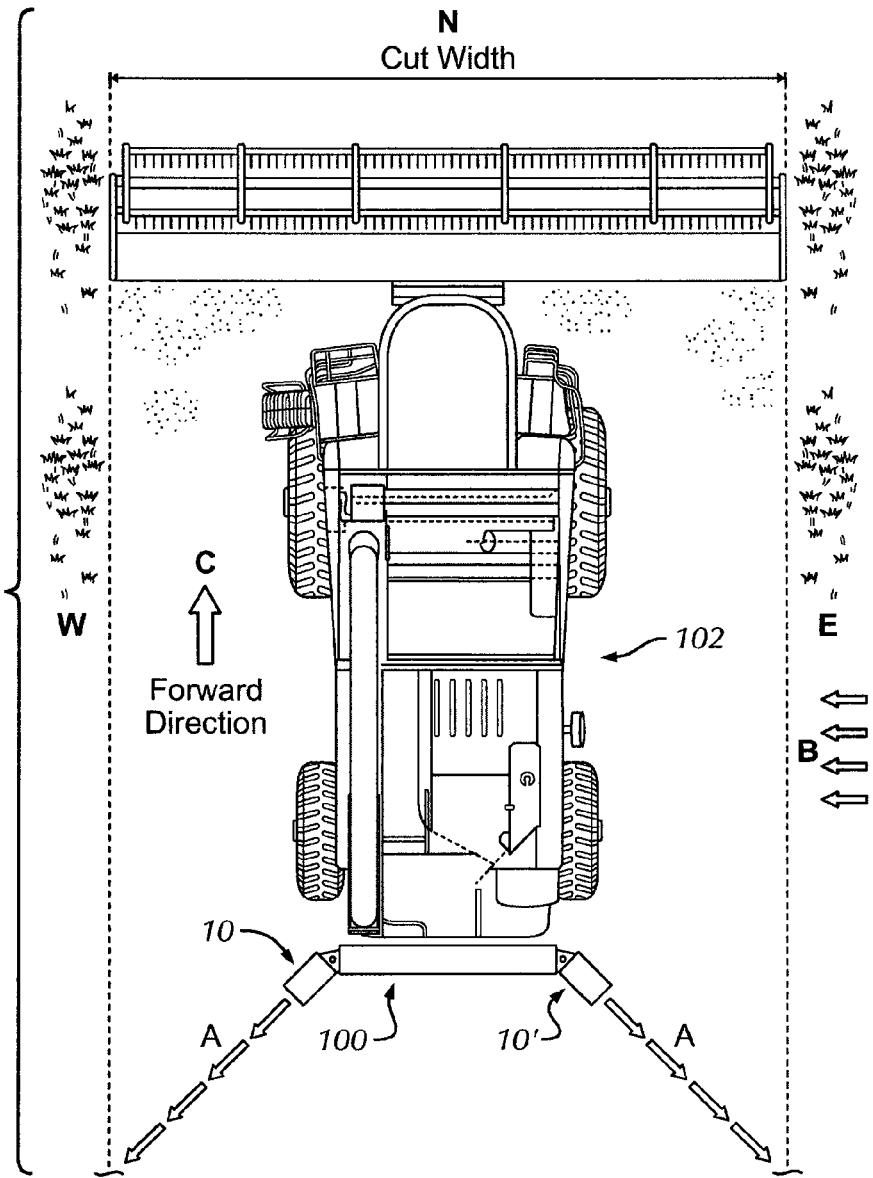
FIG. 18 is a plan view of an agricultural combine discharging crop residue rearwardly at an angle relative to the direction of travel of the combine to match the cut width of the combine header.
Figure 18A:
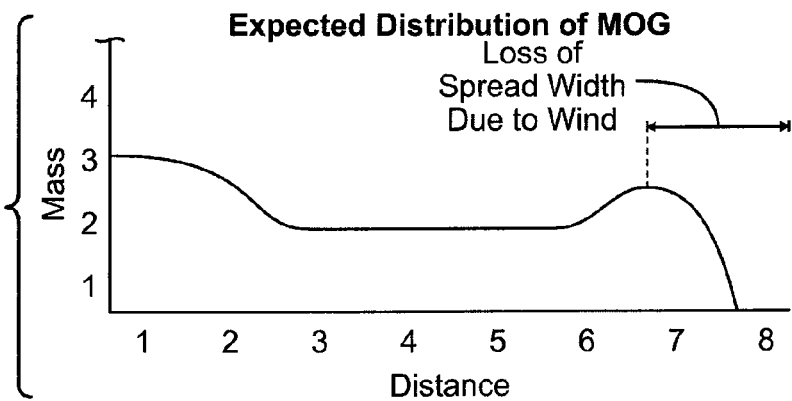
FIG. 18A is a chart of the expected distribution of MOG when the combine of FIG. 18 is operated under westerly directed crosswind conditions.
Figure 18B:
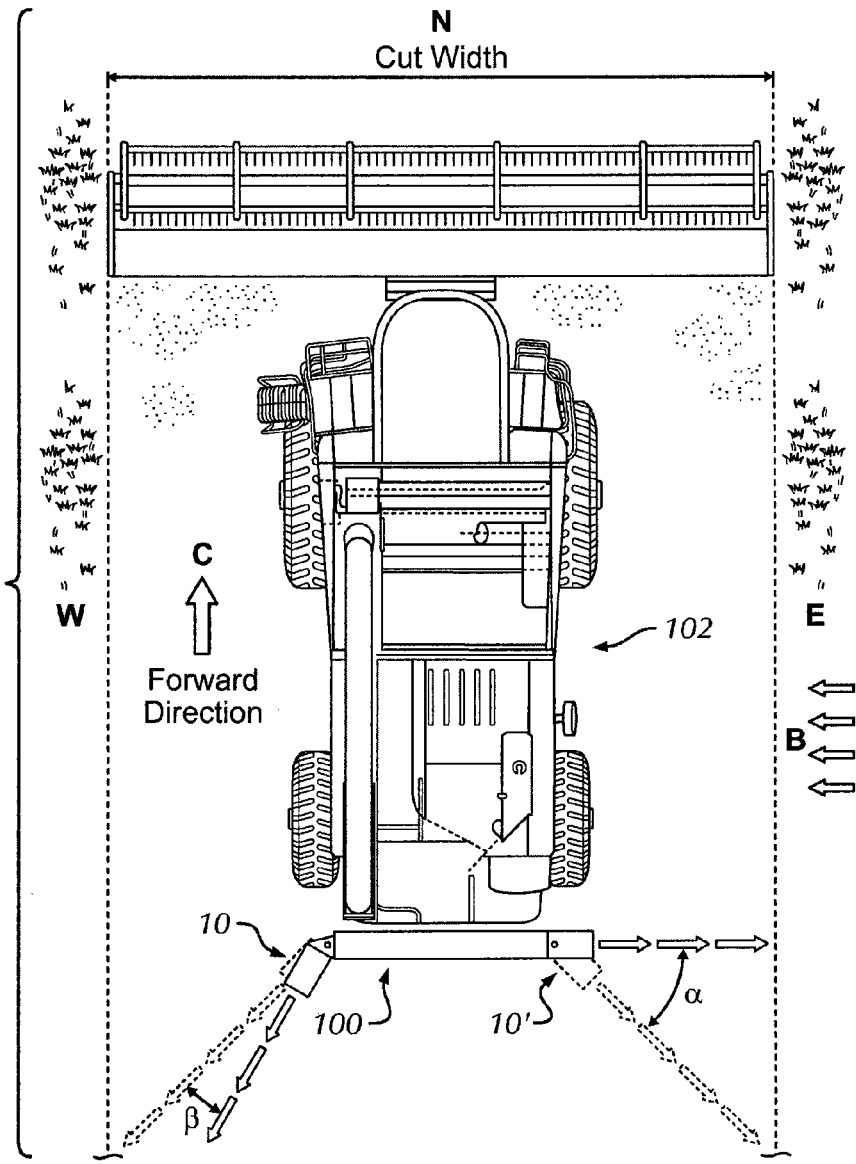
FIG. 18B is a plan view of an agricultural combine with regulators of the adjustable spreader assembly adjusted for westerly crosswind conditions and discharging crop residue rearwardly at an angle relative to the direction of travel of the combine to match the cut width of the combine header.
Figure 18C:
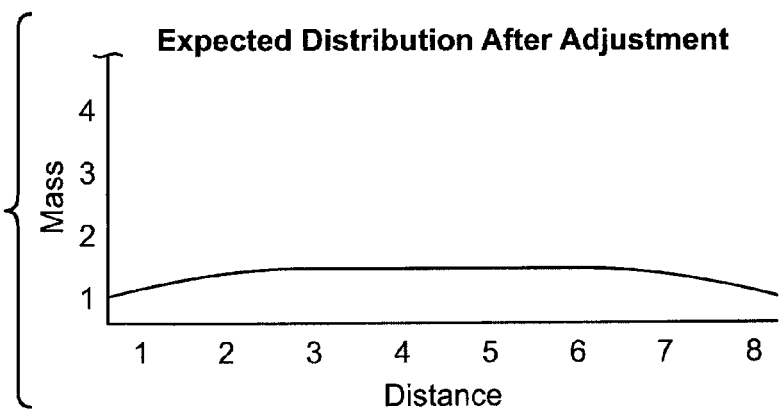
FIG. 18C is a chart of the expected distribution of MOG when the combine of FIG. 18B is operated under westerly directed crosswind conditions.
Figure 19:
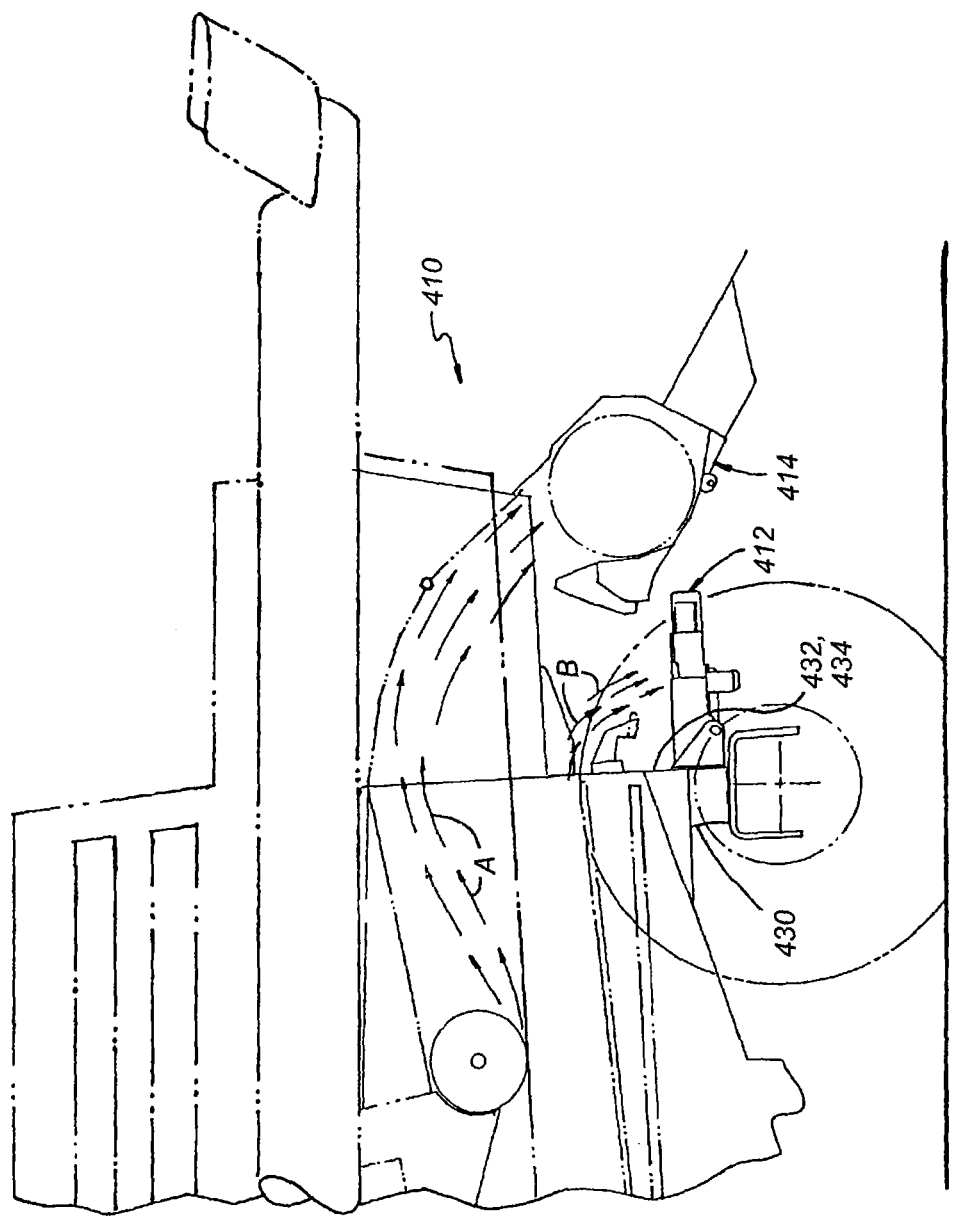
FIG. 19 is a partial, side, elevational view of a rear end of an agricultural combine with a horizontal spreader applicable to the adjustable spreader assembly (not shown) of the present invention in accordance with another preferred embodiment.

FIGS. 18-18C illustrate the pivotal adjustments of the regulators 10, 10' necessary for optimal distribution of MOG under conditions of crosswinds, represented by arrows B, perpendicular to the direction of travel, represented by arrow C. As shown in FIG. 18, the regulators 10, 10' are angled similar to that of FIG. 17 so as to match the cut width of the combine 102. However, under crosswind conditions (represented by arrows B), the flow distribution of MOG is expected to be non-uniform, as illustrated in FIG. 18A. FIG. 18A charts the expected mass of MOG over the cut width distance. As shown in FIG. 18A, the performance of the angled regulators 10, 10' is expected to be affected by crosswinds B resulting in an uneven distribution of MOG.

However, with the benefit of the present invention, the regulators 10, 10' can be adjusted to be positioned as shown in FIG. 18B. As a result, the regulators 10, 10' can compensate for environmental conditions, such as crosswinds B. For example, the combine's right-hand side regulator 10' is angled perpendicular to the direction of travel and directly into the crosswinds B. The combine's left-hand side regulator 10 is angled at about a 160 degrees angle relative to the direction of travel C or about 60 degrees relative to the direction of the crosswinds B, to advantageously compensate for the crosswinds B influence on the spread of MOG. In other words, the regulator 10' is adjusted an angle alpha relative to its original position, while the regulator 10 is adjusted an angle beta relative to its original position to compensate for crosswinds B. The advantageous effects of the pivotable regulators 10, 10' are further illustrated in FIG. 18C which charts the expected distribution after adjustments to the regulators 10, 10' to compensate for environmental conditions. As can be seen between the charts of FIGS. 18A and 18C, the distribution of MOG with adjustments due to crosswind conditions is expected to be significantly more uniform compared to an expected distribution profile without adjustments.

In accordance with a second preferred embodiment, the spreader assembly 5 can be configured as a horizontal spreader 412, instead of a vertical spreader, as shown in FIGS. 19-24 or a spread board 626, as shown in FIGS. 25-30. The second preferred embodiment is similar to that of the first preferred embodiment, except for the orientation of the spreader on the harvester. Thus, only the structure of the horizontal spreader 412 and spread board 626 applicable to the spreader assembly 5 will be described and illustrated in detail hereafter.

The horizontal spreader 412 has a forward end 436, a rearward end 438 opposite forward end 436, and opposite sides 440, 442 extending between ends 436 and 438. Horizontal spreader 412 includes a first rotary crop accelerator 444 including a rotatable element 446 mounted for rotation on a shaft 448 of a hydraulic or other motor 450, for rotation in a predetermined direction, denoted by arrow C, about a rotational axis 452 for directing the flow of crop residue to regulators 410, 410'. Rotatable element 446 includes a plurality of radially outwardly extending blades 454 supported by or in support of, a disk 456 which encircles and defines a outer radial periphery 458 of rotatable element 446. Horizontal spreader 412 includes a second rotary crop accelerator 460, including a second rotatable element 462 mounted on a shaft 464 of a second hydraulic or other motor 466, for rotation in a second predetermined direction, denoted by arrow D, about a second rotational axis 468 for directing the flow of crop residue to regulators 410, 410'. Second rotatable element 462 includes a plurality of blades 470 extending radially outwardly from shaft 464 at angularly spaced locations therearound, and connected to a disk 472 extending around and defining a outer radial periphery 474 of element 462.

Figure 20:
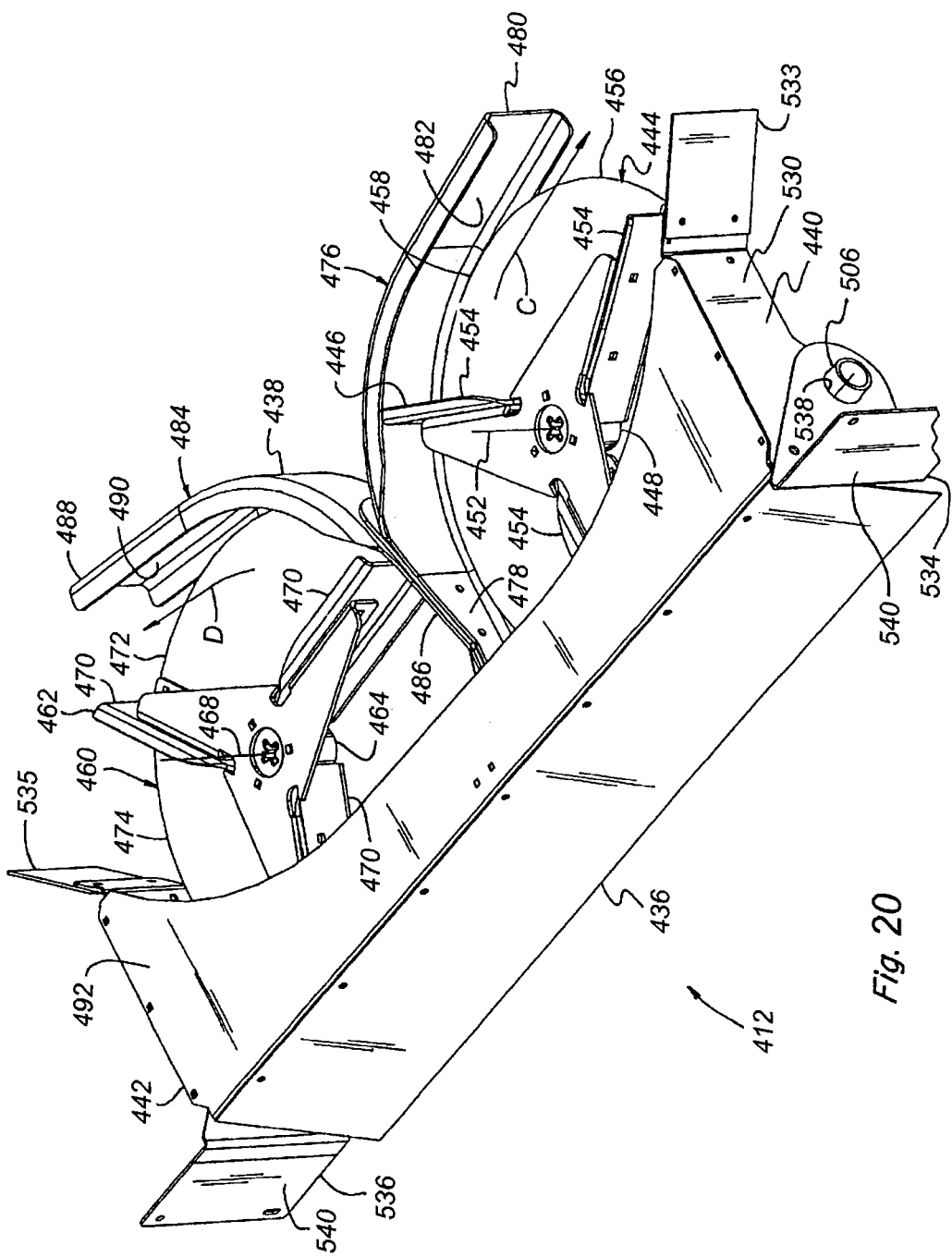
FIG. 20 is a front, top, perspective view of the horizontal spreader of FIG. 19.
Figure 24:
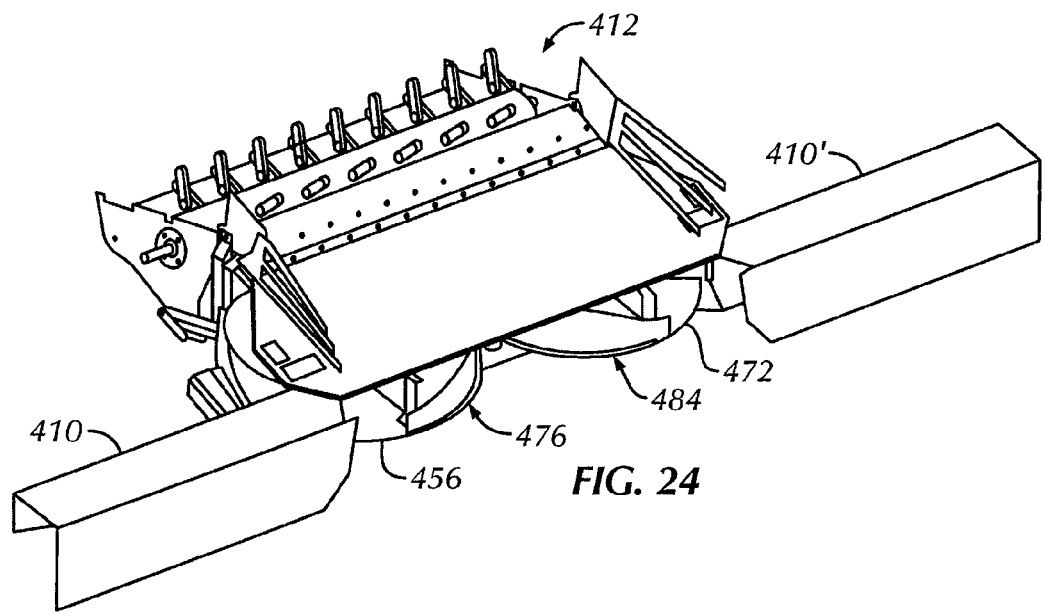
FIG. 24 is a rear, top, perspective view of the adjustable spreader assembly of the present invention assembled to a horizontal spreader.

Horizontal spreader 412 includes a first arcuate crop residue deflector 476 having a first end 478, a second end 480 opposite first end 478, and a radially inwardly facing arcuate or curved surface portion 482 extending between ends 478 and 480. Similarly, horizontal spreader 412 includes a second arcuate crop residue deflector 484 having a first end 486, a second end 488 opposite first end 486, and a radially inwardly facing arcuate or curved surface portion 490 extending between ends 486 and 488. When viewed from the first or second end, each of deflectors 476 and 484 preferably has a channel or U-shape cross-section, as best shown in FIG. 20. Horizontal spreader 412 additionally includes a shield 492 on forward end 436 and in partially covering relation to forward portions of first and second rotary crop accelerators 444 and 460 (shown removed in FIG. 21). Shields 492 and 436 are used when spreader 412 is installed at location shown in FIG. 19. Shields 492 and 436 are removed when attached to hood mount chopper 624, as seen in FIG. 24.

Figure 21:
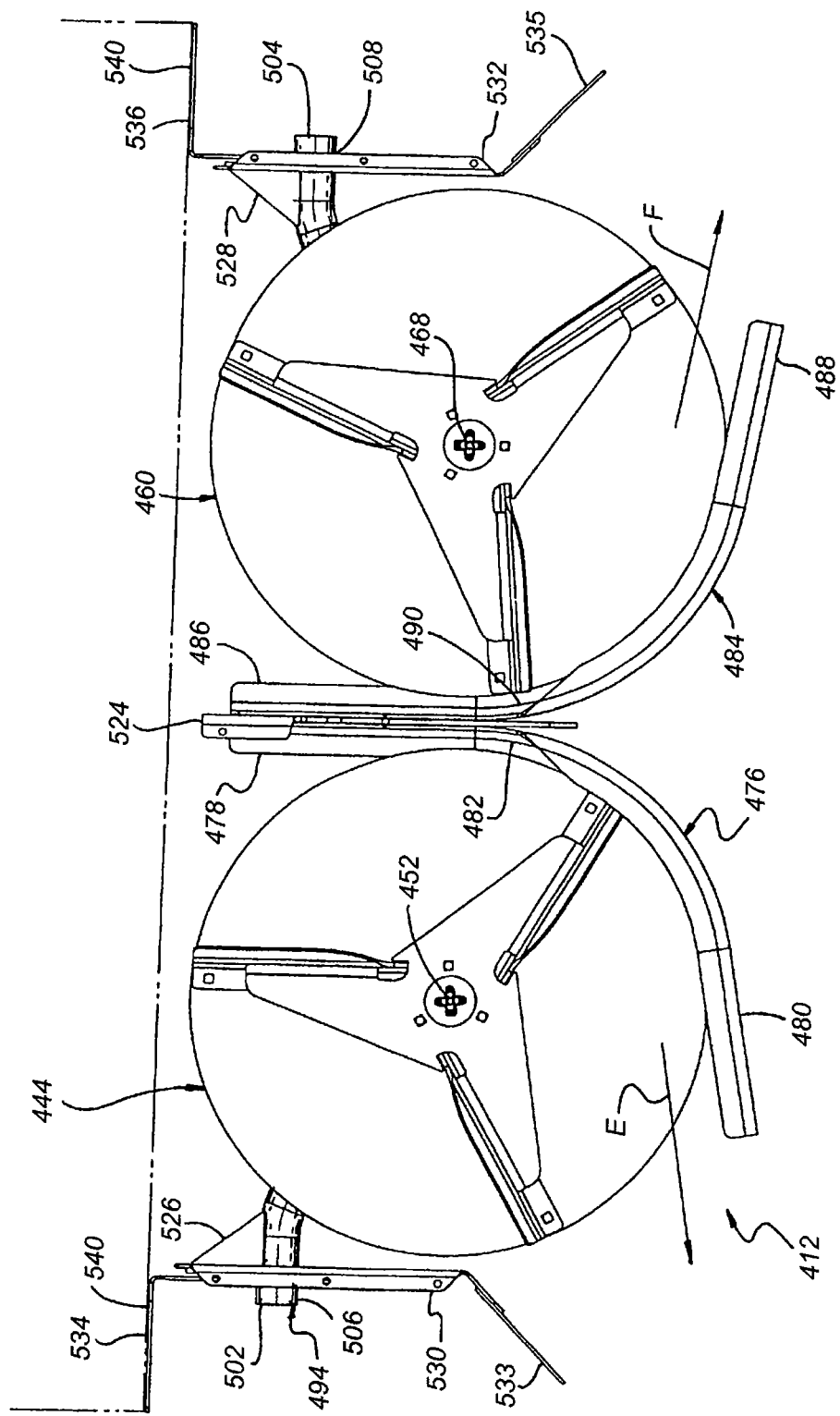
FIG. 21 is a plan view of the horizontal spreader of FIG. 19.
Figure 22:
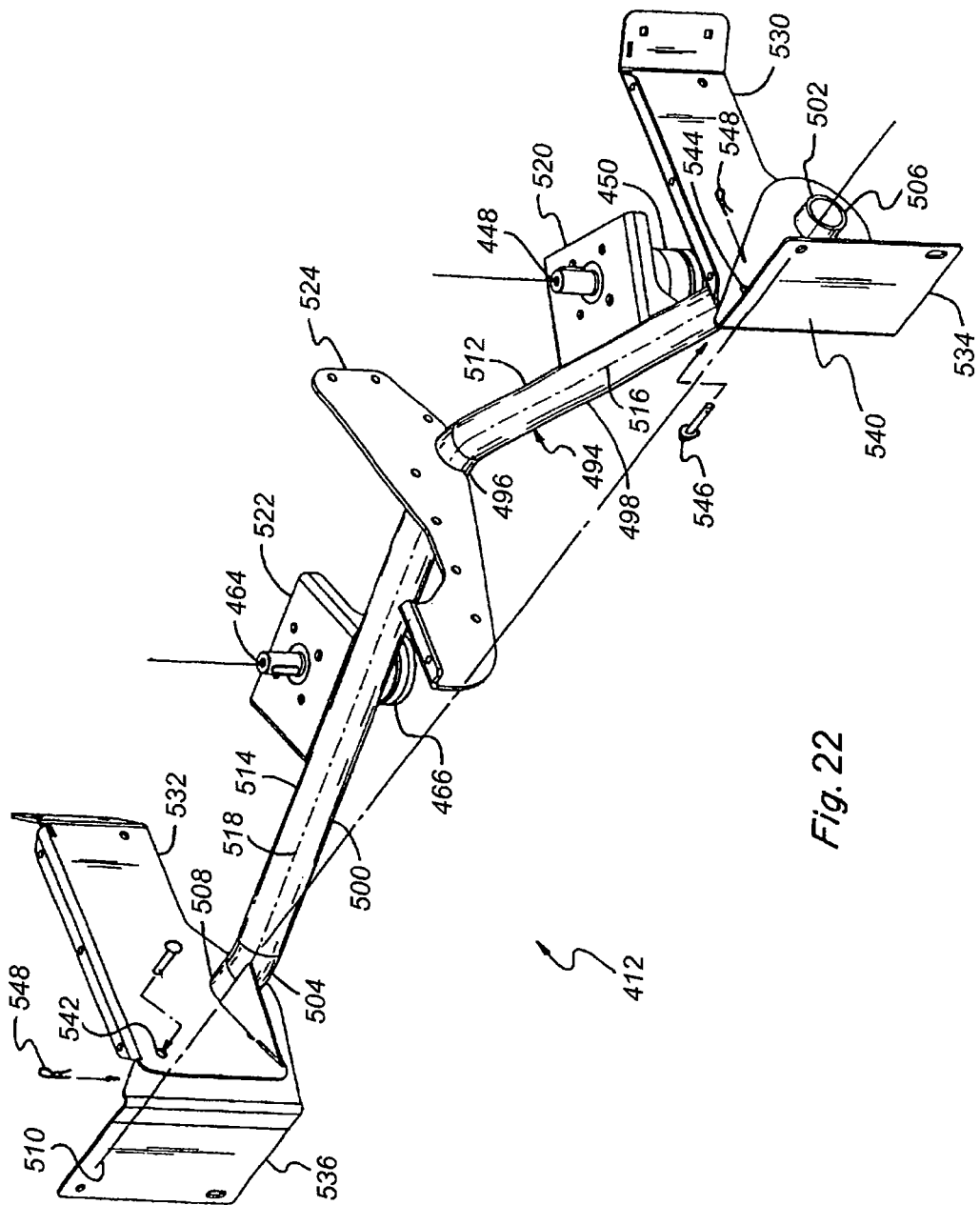
FIG. 22 is a perspective view of a tubular support for the horizontal spreader of FIG. 19.

Referring also to FIG. 22, horizontal spreader 412 importantly includes an elongate tubular support element 494 which is preferably a unitary tube, including a center portion 496 and a pair of legs 498, 500 extending outwardly in opposite from directions from center portion 496. Legs 498, 500 include end portions 502 and 504, respectively, opposite center portion 496. End portions 502, 504 include pivot elements 506 and 508, respectively, axially aligned about a pivotal axis 510 extending therethrough, for pivotal connection of horizontal spreader 412 to side portions 432 and 434 or another convenient portion of rear frame portion 430 of combine 409. Legs 498 and 500 additionally include intermediate portions 512 and 514, respectively, which are angularly related to one another about center portion 496, so as to form a V-shape, as best shown in FIG. 22. Intermediate portions 512 and 514 have longitudinal axes 516 and 518 extending therethrough, respectively, axes 516 and 518 preferably being at least generally coplanar with pivotal axis 510. Intermediate portions 512 and 514 include mounting elements 520 and 522 mounted thereon, respectively, for supporting first and second rotary crop accelerators 444 and 460 in side-by-side relation on support element 494, as best shown in FIGS. 20 and 21. Essentially, each mounting element 520, 522 includes a plate fixedly connected to intermediate portion 512 or 514 by welding, fasteners or other suitable attachment, motors 450 and 466 being mounted on mounting element 520, 522, respectively, using fasteners such as screws or bolts, and the rotatable element 446, 462 being mounted to shaft 448 or 464 of the motor 450, 466, respectively, for rotation therewith. The V-shape of the intermediate portions 512, 514 about central portion 496 positions rotary crop accelerators 444, 460 to one side of pivotal axis 510, and enables both crop accelerators 444 and 460 to be simply mounted on a single support element. Additionally, center portion 496 includes a mount 524 extending outwardly therefrom, for mounting first and second arcuate crop residue deflectors 476 and 484 to tubular support element 494.

Figure 23:
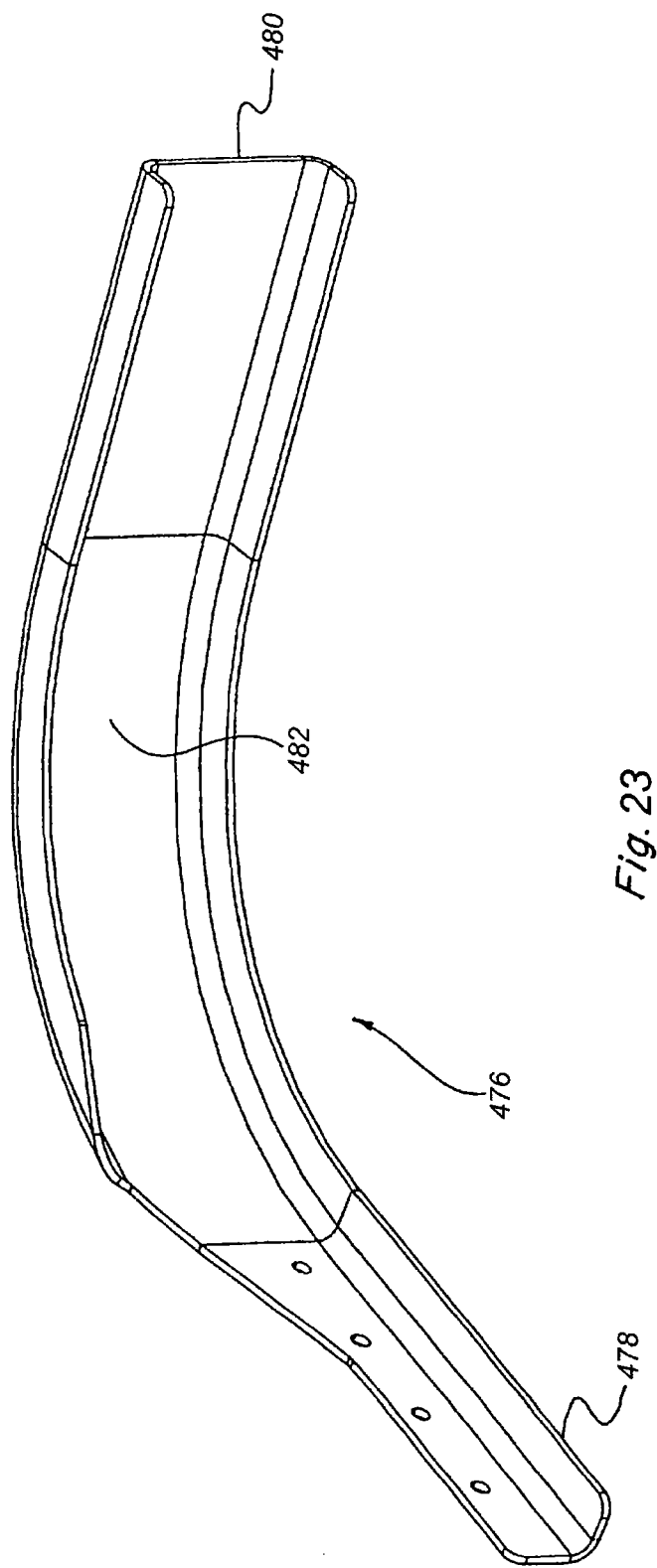
FIG. 23 is a perspective view of a deflector of the horizontal spreader of FIG. 19.

Referring also to FIG. 23, each crop residue deflector 476, 484, as represented by deflector 476, is adapted to be connected by first end 478 or 486 to mount 524 so as to be supported in cantilever relation to support element 494. Deflectors 476 and 484 can be connected to mount 524 using any suitable fasteners, such as bolts, screws or the like using the holes in first end 478 shown, or by welding, or any other suitable attachment. Preferably, first ends 478 and 486 are connected in back-to-back relation to mount 524, so as to be stiffened and strengthened by each other. Referring more particularly to FIG. 21, mount 524 is located at a predetermined angular position about rotational axes 452, 468, to position first ends 478 and 486 of deflectors 476 and 484 at that position, and such that second ends 480 and 488 are located at second angular positions about axes 452 and 468, respectively, for guiding crop residue received and carried and accelerated by accelerators 444 and 460 along predetermined paths, defined by surface portions 482 and 490 of the deflectors, so as to be discharged from horizontal spreader 412 along opposite discharge flow paths, as denoted by arrows E and F, respectively, into respective regulators 410, 410', as shown in FIG. 24. Because deflectors 476 and 484 are supported in cantilever relation, and smoothly extend to second ends 480 and 488 thereof, respectively, there is no location thereon for crop residue to snag and/or collect on the deflectors so as to form clumps when eventually freed, or clog the crop accelerator, or interfere with the smooth distribution of crop residue thereby. Also, because crop accelerators 444 and 460 and deflectors 476 and 484 are supported solely on and by tubular support element 494, there is no significant location for deposition and collection of crop residue which could later fall onto a field in a clump, or interfere with operation of horizontal spreader 412, and require manual removal.

As an additional feature in this regard, end portions 502, 504 of tubular support element 494 include brackets 526 and 528, respectively, fixedly mounted thereon for pivotal movement therewith, adapted for supporting shield 492 in covering relation to forward end 436 of hood mount chopper 412, and in partially covering relation to the forward ends of crop accelerators 444 and 460 (as best shown in FIG. 20). Brackets 526 and 528 additionally include side walls 530 and 532 fixedly mounted thereon and extending rearwardly therefrom which are positioned to abut or connect to and support shield 492 in the position shown in FIG. 20. Side walls 530 and 532 include deflectors 533 and 535, respectively, angularly oriented with respect thereto and with respect to deflectors 476 and 484, respectively, for additionally providing guidance and control for accelerated flows of crop residue discharged from horizontal spreader 412. Referring more particularly to FIG. 20, as a result of the mounting and support of shield 492 by brackets 526 and 528 adjacent covered regions of crop accelerators 444 and 460, and because no bottom enclosure is provided, there is no location for crop residue to collect in significant quantities beneath shield 492.

Referring also more particularly to FIGS. 21 and 22, as discussed above, pivot elements 506 and 508 on ends portions 502 and 504, respectively, comprise cylindrical elements, which are most preferably sections of tubular support element 494 aligned so as to be coaxial along pivot axis 510, such that the cylindrical outer surfaces thereof serve as the support and bearing surfaces for horizontal spreader 412. Pivot elements 506 and 508 are pivotally supportable using any suitable members, such as L-shaped brackets 534 and 536 each including a hole 538 therethrough for receiving pivot element 506 or 508 for rotation therein, and a plate or other element 540 mountable to one of the side portions 432 or 434 of rear frame portion 430 of combine 409, using bolts, other fasteners, welding, or other means of attachment. Thus, it can be seen that by utilizing a single, unitary tubular support element 494, and bending the tubular member at center portion 496 and at end portions 502 and 504, and attaching mounting elements 520 and 522 thereto for supporting rotary crop accelerators 444 and 460, and by attaching mount 524 and brackets 526 and 528 to the tubular element, an effective, strong and rigid yet simple support structure for horizontal spreader 412 is achieved, which is economical, and allows flow of crop residue thereby, without undesirable accumulation of the residue on the support structure. The curved upper surface of tubular support element 494 facilitates passage of crop residue thereby, due to the lack of a place on the element for holding or retaining the residue, such that residue that leaks or passes below crop accelerators 444 and 460 will fall to the ground and not clump or otherwise build up or cause other problems.

Brackets 526 and 528 fixedly supported on tubular support element 494 each include holes 542 which are aligned with corresponding holes 544 through L-shape brackets 534 and 536, respectively, when horizontal spreader 412 is in a horizontal position as shown in FIG. 19 for removably receiving a pin 546 for holding horizontal spreader 412 in the horizontal position, as illustrated in FIG. 22. Pins 546 are retained by retainer clips 548, and are removable from holes 542 and 544, as desired, to allow horizontal spreader 412 to pivot about pivotal axis 510 to an alternative position, such as, but not limited to a more vertical position.

FIGS. 25-30 illustrate a spread board 626 spreader applicable to the present embodiment. Chopper 624 includes a housing 628 which receives a flow of crop residue through a forward opening 630, from a threshing system (not shown) of combine 620. Housing 628 contains a rotary device 631 powered by combine 620 and including a rotatably driven shaft 632, which carries a plurality of knives or flails (also not shown) for rotation in the direction indicated by arrow A, for propelling the crop residue through housing 628 and outwardly therefrom through a discharge outlet 634. Housing 628 contains a plurality of fixed knives or bars (not shown) against which the crop residue is propelled en route to outlet 634, for chopping the crop residue, although the knives or bars can be removed, retracted or deleted such the crop residue will be propelled from chopper 624 unchopped, all in the well known manner.

Figure 27:
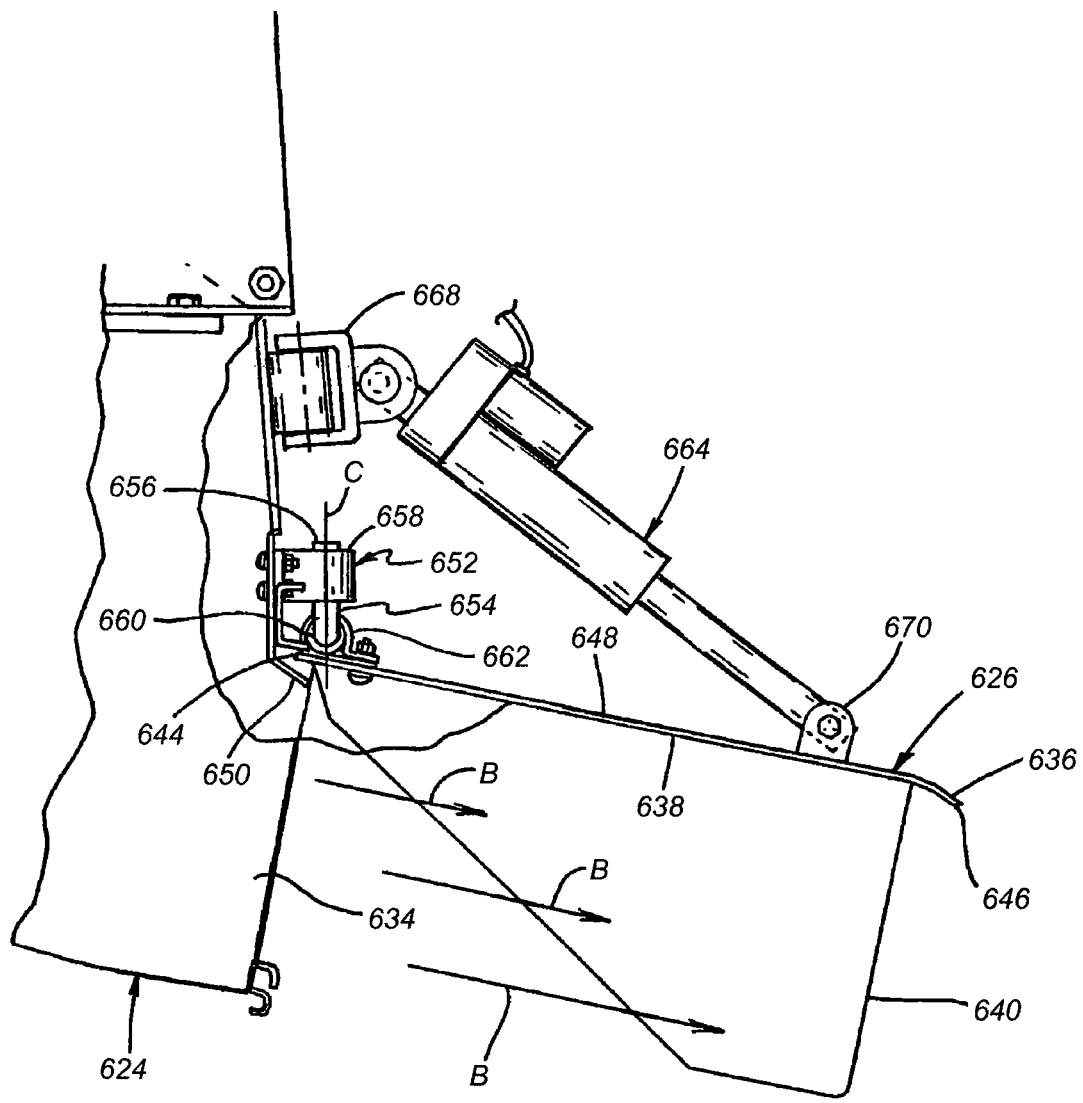
FIG. 27 is a partial, side, elevational view of the spread board of FIG. 25.

Referring to FIG. 27, the spread board 626 of chopper 624 is of rigid construction, for instance of sheet metal or like material, including a surface 638 having a plurality of vanes 640 extending therealong defining a plurality of crop residue flow channels 642 arranged in a row along surface 638. Spread board 636 has a sidewardly extending first or upstream edge 644, and a sidewardly extending opposite second or downstream edge 646, vanes 640 extending therebetween. Spread board 636 is preferably positioned and used with surface 638 and vanes 640 directed downwardly as shown, and with an opposite surface 648 extending upwardly, with upstream edge 644 located adjacent to a sidewardly extending edge 650 of housing 628 defining an upper periphery of discharge outlet 634. In this position, vanes 640 extend downwardly into the flow of crop residue through outlet 634, denoted by arrows B in FIG. 27, for guiding the flow through flow channels 642, such that the crop residue will be deposited on a field in a desired pattern, particularly having a desired sideward extent and uniformity of coverage.

Spread board 636 is preferably mounted to and supported on housing 628 or the rear end of combine 620 by a single pivot mount 652, so as to extend in the above described manner sidewardly at least generally horizontally across discharge outlet 634, such that vanes 640 are positioned for guiding the crop flow for deposition on a field in a desired pattern. Single pivot mount 652 is advantageous as it simplifies construction, and provides the ability to pivot the spread board 636 and vanes 640 simultaneously and in a unitary manner, about an upwardly and downwardly extending first pivotal axis C, for achieving a desired positioning of a crop residue spread pattern on a field, without requiring altering characteristics of the pattern itself. Primarily, this will typically be in terms of alignment of the sideward edges of the pattern with desired locations in relation to a swath of a field just harvested by combine 620, as will be explained. Pivot mount 652 preferably includes an L shape pivot member 654 having an upstanding end 656 supported for rotation about first pivotal axis C (FIG. 27), in a bushing 658 or other element which allows pivotal movement thereof, mounted on housing 628 using common bolts or other fasteners. Alternatively, bushing 658 could be mounted at a suitable location on the rear end of combine 620. Pivot member 654 includes a generally horizontal cylindrical end 660 oriented so as to extend sidewardly about a generally horizontal second pivotal axis D (FIG. 26) and received in a bushing 662 or other element which allows pivotal movement thereof, mounted on spread board 636. As a result, spread board 636 and vanes 640 are jointly and simultaneously pivotable in a unitary manner about either or both of the pivotal axes C and D, supported by the single pivot mount 652.

Figure 28:
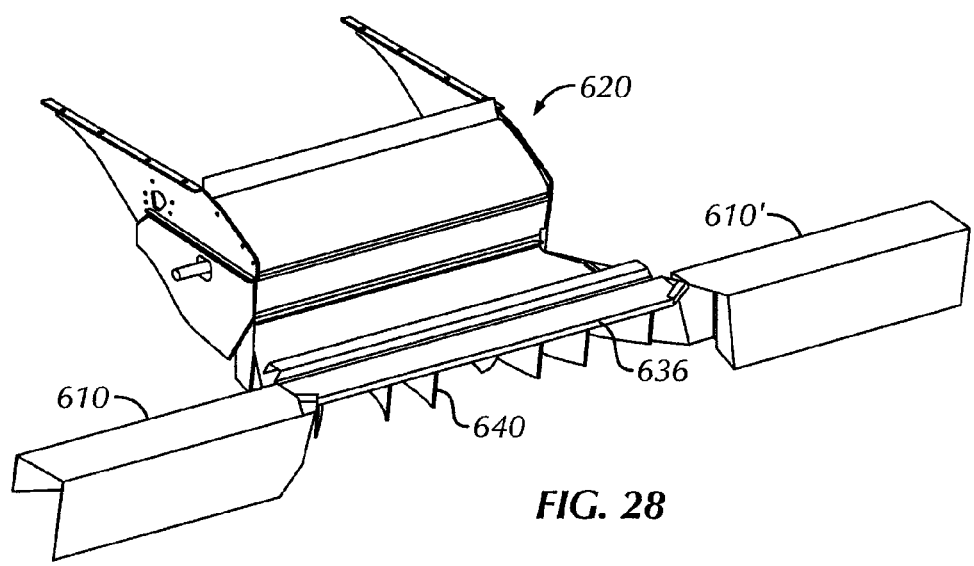
FIG. 28 is a rear, top, perspective view of a typical hood-mount chopper assembly of the present invention having a typical spread board and a regulator in accordance with the present invention.
Figure 25:
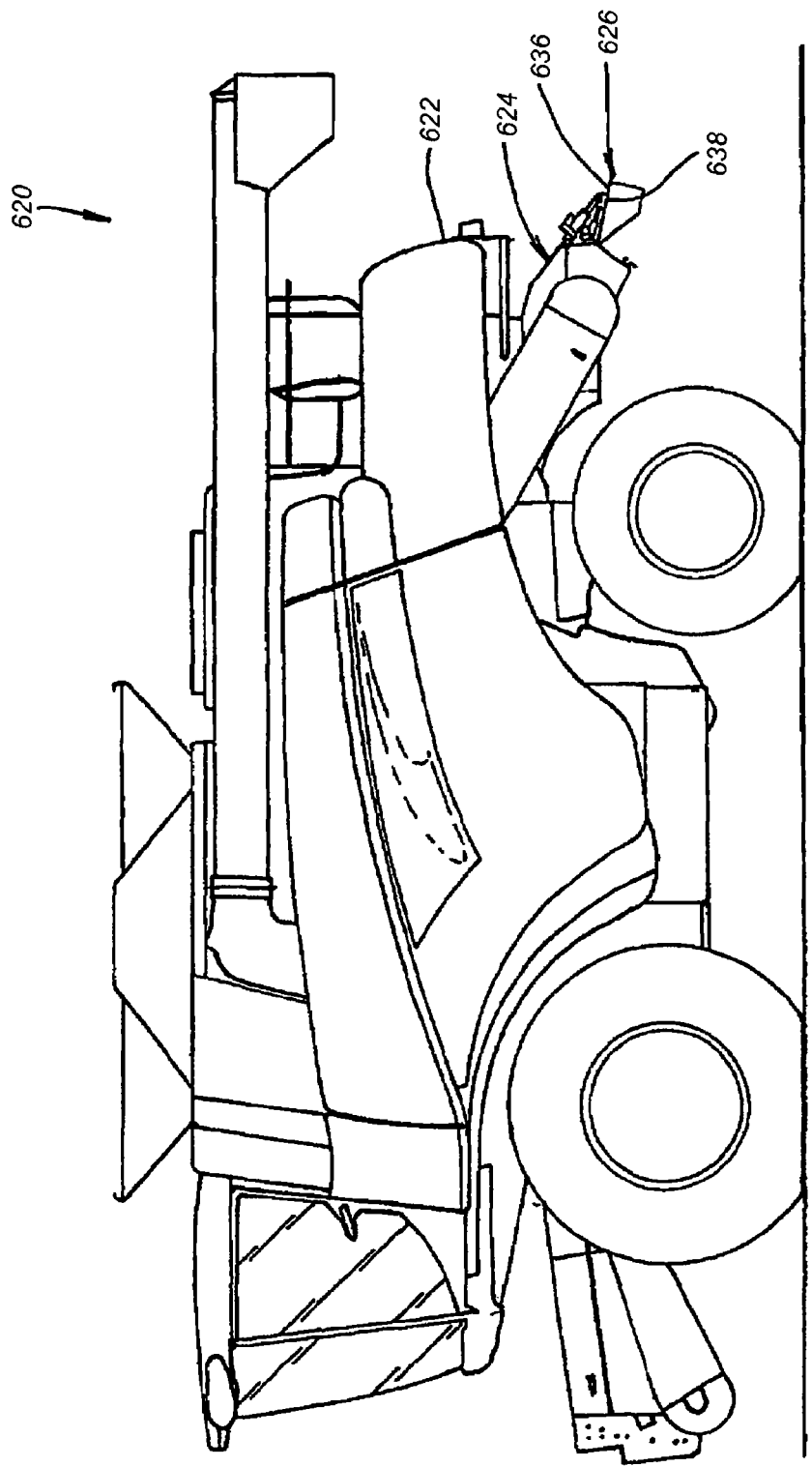
FIG. 25 is a side elevational view of a rear end of an agricultural combine with a spread board applicable to the adjustable spreader assembly (not shown) of the present invention in accordance with yet another preferred embodiment.
Figure 26:
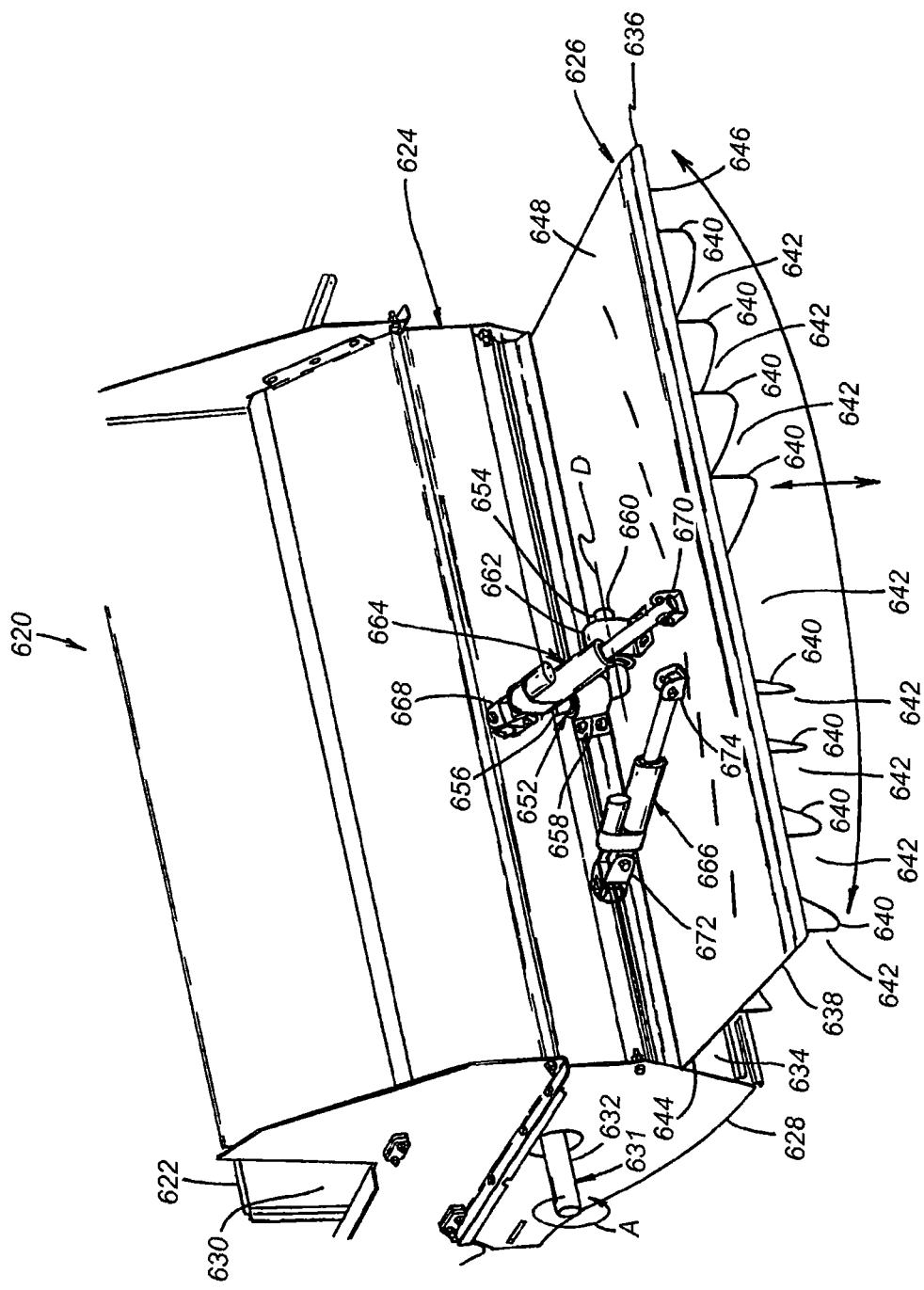
FIG. 26 is a rear, top, perspective view of the spread board of FIG. 25.

As noted above, it is desired in many instances to distribute the crop residue discharged by chopper 624 substantially evenly over the width of, and in alignment with, a swath of the field from which the crop has just been harvested by combine 620, which width is typically defined by the overall width of a header of combine 620, which width can be as much as 30 to 40 feet in the instance of some headers currently in use. Thus, it is desirable that a spread board 636 have the capability to guide and distribute crop residue propelled by chopper 624 over a field in an even and/or uniform pattern having a sideward extent equal to about the width of the header. The sideward extent and uniformity of the pattern of deposition can be achieved by setting the positions or angular orientation of the individual vanes 640 which guide the crop residue flows, by adjusting the speed of operation of chopper 624, and/or by setting the angle of the spread board 636 and vanes 640 in combination with regulators 610, 610' (FIG. 28). Vanes 640 can be preset or fixed permanently in position, or they can be adjustably fixable in position, using common elements such as clamps, fasteners, or the like, so as to direct the flow of crop residue uniformly over the cut width of the combine and through the regulators 610, 610'.

Figure 29A:
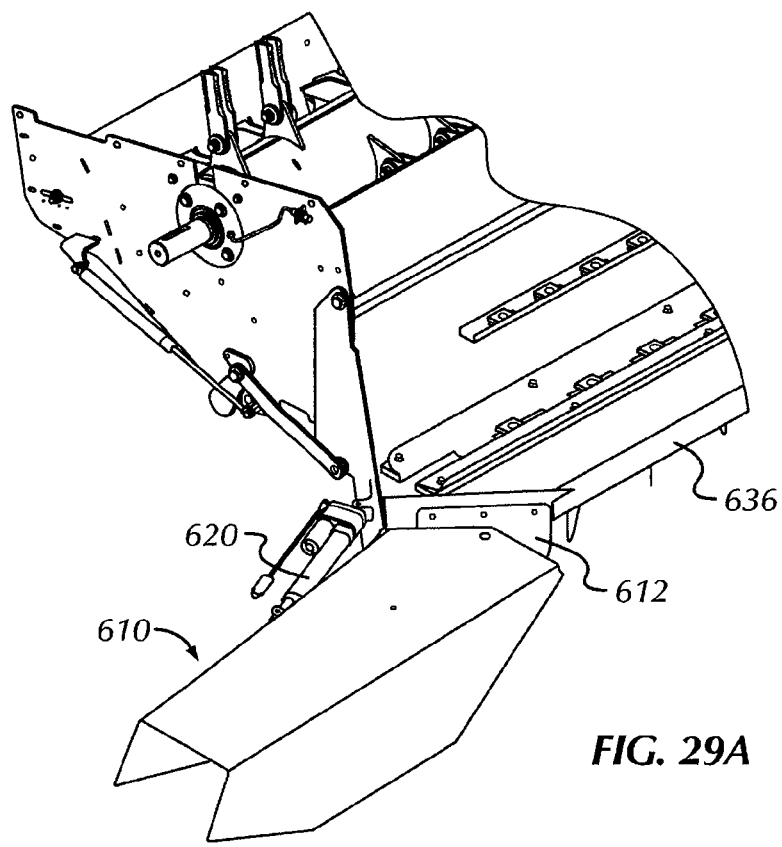
FIG. 29A is a rear, top, perspective view of the regulator of FIG. 28.
Figure 29B:
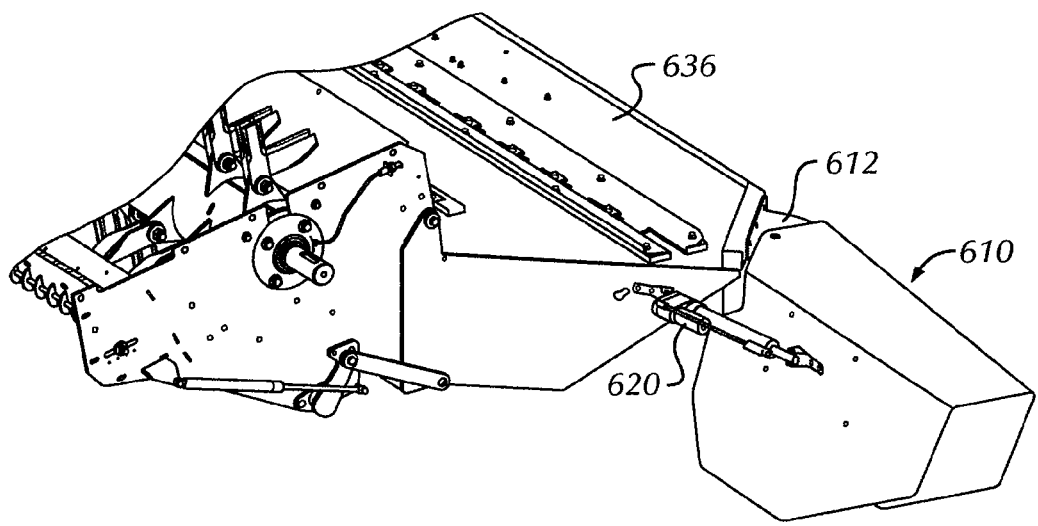
FIG. 29B is a front, top, perspective view of the regulator of FIG. 28.
Figure 30:
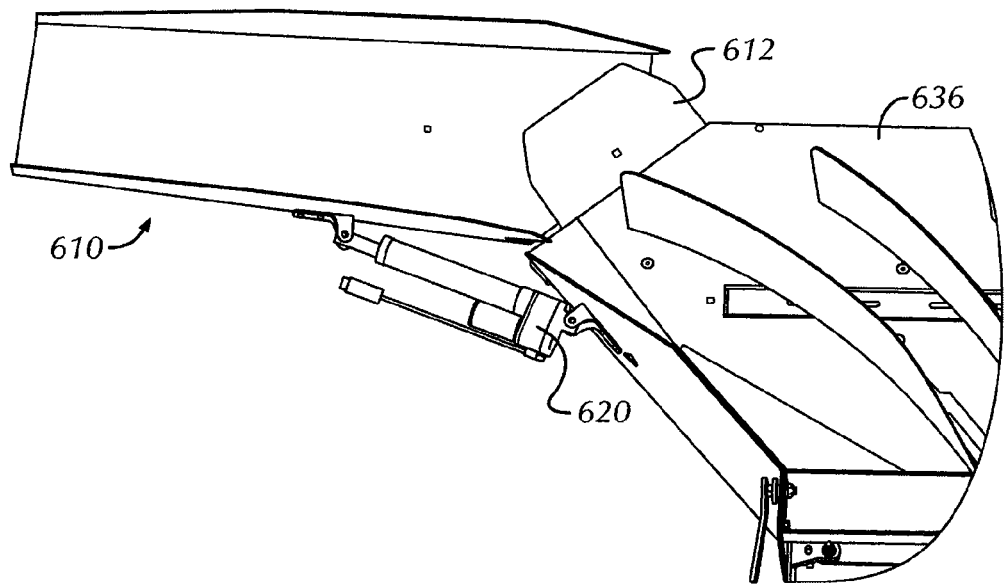
FIG. 30 is an inferior, perspective view of the underside of the regulator of FIG. 28.

FIGS. 29A, 29B and 30 further illustrate how the regulator 610 and an actuator 620 assembled to the spread board 636. Referring to FIG. 29A, the regulator 610 is connected to the spread board 626 via a mounting bracket 612. The mounting bracket 612 is directly bolted to the spread board 636 on one end and pivotably mounted to regulator 610 about the other end. The regulator 610 can be pivotally mounted by any well known means in the art. A detailed description of such pivotable mounting means is not necessary for a complete understanding of the present invention. The actuator 620 is also pivotably mounted to both a lateral frame portion of the spread board 636 and a fore portion of the regulator 610.

Referring back to FIG. 26, to enable making adjustments easily and quickly, spread board 636 is controllably pivotable about axis D by an actuator 664, and about axis C by an actuator 666, both connected between housing 628 and spread board 636. Actuator 664 is controllably extendable for pivoting spread board 636 and vanes 640 together in a unitary manner downwardly about pivot mount 652 and axis D for lowering downstream edge 646, and is retractable for pivoting spread board 636 and vanes 640 upwardly about axis D for raising edge 646. Actuator 666 is controllably extendable for pivoting spread board 636 and vanes 640 together in a unitary manner sidewardly about pivot mount 652 and axis C toward the right side when viewed in FIG. 26, and is retractable for pivoting spread board 636 and vanes 640 toward the left side. These orientations could be reversed, as desired. Actuators 664 and 666 are each preferably a linear actuator and can be electrically or fluid powered, as controlled in the well known conventional manner by operator controls in the operator cab of combine 620, to extend and retract. Actuators 664 and 666 could alternatively be rotary actuators or the like.

Actuator 664 has one end pivotally connected by a pivotable element such as a double pivot 668, to chopper 624 at a location above and generally axially aligned with pivotal axis C through pivot mount 652, and an opposite end connected by a pivot 670 to spread board 636. This allows pivotal movement upwardly and downwardly as caused by actuator 664 itself, and also freedom to pivot sidewardly with sideward pivotal movement of spread board 636, as caused by actuator 666. Similarly, actuator 666 has an end connected by a double pivot 672 to chopper 624 and an opposite end connected by a pivot 674 to spread board 636. This allows sideward pivoting as caused by actuator 666 itself, and freedom for upward and downward pivoting by actuator 664. As a result, spread board 636 and vanes 640 are supported by single pivot mount 652, and can be controllably pivoted about both axes C and D, as required for achieving a desired crop residue placement and/or alignment on a field, and held in the selected position by actuators 664 and 666. Here, it should be noted that, alternatively, the ends of actuators 664 and 666 could be connected to the chopper housing with other pivotal elements, such as Hooke's joints or the like, to provide the desired pivotability.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A residue discharge device for an agricultural combine comprising:
    a spreader operatively connected to a rear end of the agricultural combine, the spreader including:
        a spreader housing having:
            an inlet for receiving a flow of residue, and
            an outlet configured about a lateral side of the housing for discharging the flow of residue,
        rotary blades operatively connected to the housing for rotating therein, wherein rotation of the rotary blades discharges the flow of residue received through the inlet out through the outlet; and
    a regulator pivotably connected to a lateral side of the spreader about a substantially vertical axis to pivot the regulator in a fore and an aft direction and wherein the regulator comprises a regulator housing having enclosing sides and a substantially downwardly facing open side and is in fluid communication with the spreader housing outlet for guiding and shielding the flow of residue discharged from the spreader housing.

2. The residue discharge device of claim 1, wherein the spreader is a vertical spreader, a horizontal spreader or a spread board.

3. The residue discharge device of claim 1, wherein the regulator is further configured to be pivotably connected to the lateral side of the spreader about a substantially horizontal axis.

4. The residue discharge device of claim 3, further comprising an adjustor for adjusting the regulator from a first position in which the regulator extends in a substantially vertical direction to a second position in which the regulator extends in a substantially horizontal direction.

5. The residue discharge device of claim 1, wherein the regulator housing enclosing sides comprises:
    a front wall;
    a rear wall; and
    an upper portion connecting the front and rear walls.

6. The residue discharge device of claim 5, wherein the rear wall is tapered.

7. The residue discharge device of claim 5, wherein the front or rear wall tapers in the lateral superior direction.

8. The residue discharge device of claim 5, wherein the front or rear wall tapers in a stepwise configuration.

9. The residue discharge device of claim 5, wherein the regulator comprises an arch shape of about 270 degrees.

10. The residue discharge device of claim 1, wherein the regulator includes a proximal end and a distal end and wherein the distal end includes a cross-sectional area smaller than a cross-sectional area of the proximal end.

11. The residue discharge device of claim 1, wherein the regulator is extendable from a retracted position to an extended position.

12. The residue discharge device of claim 11, wherein the regulator is extendable to an overall length of at least two feet.

13. The residue discharge device of claim 1, wherein the regulator is one of a telescoping regulator, a foldable regulator, or a combination thereof.

14. The residue discharge device of claim 1, wherein the regulator comprises a retarder.

15. The residue discharge device of claim 1, wherein the regulator comprises at least one guide surface.

16. The residue discharge device of claim 1, further comprising an actuator for pivoting the regulator in the fore and the aft direction.

17. The residue discharge device of claim 1, wherein the regulator is selectively positionable.

18. The residue discharge device of claim 1, further comprising a second spreader configured side-by-side the spreader and a second regulator, each of the regulator and second regulator pivotably connected to a respective lateral side of a separate one of the spreader and the second spreader, wherein each regulator is at least two feet in overall length.

19. The residue discharge device of claim 1, wherein the regulator comprises a first portion and a second portion pivotably connected to the first portion.

20. The residue discharge device of claim 1, wherein the regulator comprises a vane configured about an inner surface of the regulator.

21. The residue discharge device of claim 1, wherein the regulator comprises:
    an outer shell; and
    an inner shell spaced apart from the outer shell forming a flow path in communication with a supply of high velocity air.

22. An adjustable vertical spreader assembly for an agricultural combine comprising:
    a vertical spreader operatively connected to a rear end of the agricultural combine, the vertical spreader including:
        an inlet for receiving a flow of residue, and
        an outlet configured along a lateral side of the vertical spreader for discharging the flow of residue; and
    a regulator pivotably connected to the lateral side of the spreader in fluid communication with the outlet for guiding and shielding the flow of residue discharged from the spreader, the regulator including:
        a fore wall,
        an aft wall,
        an upper wall connecting the fore and aft walls, and
        a substantially downwardly facing opening, and wherein the regulator is configured to move between a first position and a second position.

23. The adjustable vertical spreader assembly of claim 22, wherein the first position is a retracted position and the second position is an extended position.

24. The adjustable vertical spreader assembly of claim 22, wherein the regulator comprises a plurality of downwardly depending vanes about an interior of the regulator.

25. An adjustable horizontal spreader assembly for an agricultural combine comprising:
    a horizontal spreader operatively connected to a rear end of the agricultural combine, the horizontal spreader including:
        an inlet for receiving a flow of residue, and an outlet configured along a lateral side of the horizontal spreader for discharging the flow of residue; and a regulator connected to the lateral side of the spreader in fluid communication with the outlet for guiding and shielding the flow of residue discharged from the spreader, the regulator including:
a fore wall,
an aft wall,
a substantially downwardly facing opening, and an upper wall connecting the fore and aft walls, and
wherein the regulator is configured to move between a first position and a second position.

26. The adjustable horizontal spreader assembly of claim 25, wherein the first position is a retracted position and the second position is an extended position.

27. The adjustable horizontal spreader assembly of claim 25, wherein the regulator comprises a vane configured about an inner surface of the regulator.

28. A residue discharge device for an agricultural combine comprising:

a spreader operatively connected to a rear end of the agricultural combine, the spreader including:
a housing having:
an inlet for receiving a flow of residue, and
an outlet configured about a lateral side of the housing for discharging the flow of residue,
rotary blades operatively connected to the housing for rotating therein, wherein rotation of the rotary blades discharges the flow of residue received through the inlet out through the outlet; and
a regulator having a substantially arched configuration and a substantially downwardly facing opening, said regulator pivotably connected to the lateral side of the spreader about a substantially vertical axis to pivot the regulator in a fore and an aft direction and wherein the regulator is in fluid communication with the housing outlet for guiding and shielding the flow of residue discharged from the housing in a substantially lateral direction.

* * * * *